Figure 14:
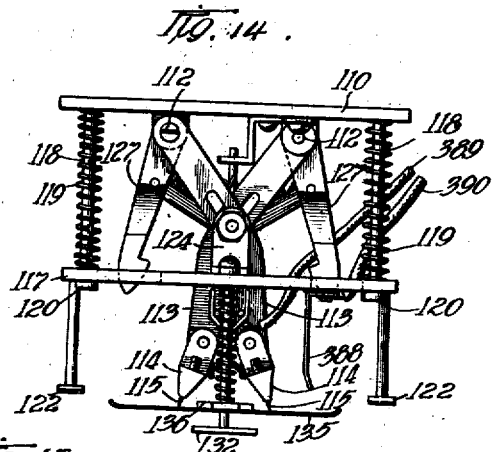

W. P. DUN LANY.
MACHINE FOR AFFIXING SAMPLES TO SHEETS.
APPLICATION FILED JULY 14, 1916.
1,327,665.
Patented Jan. 13, 1920.
22 SHEETS—SHEET 1.
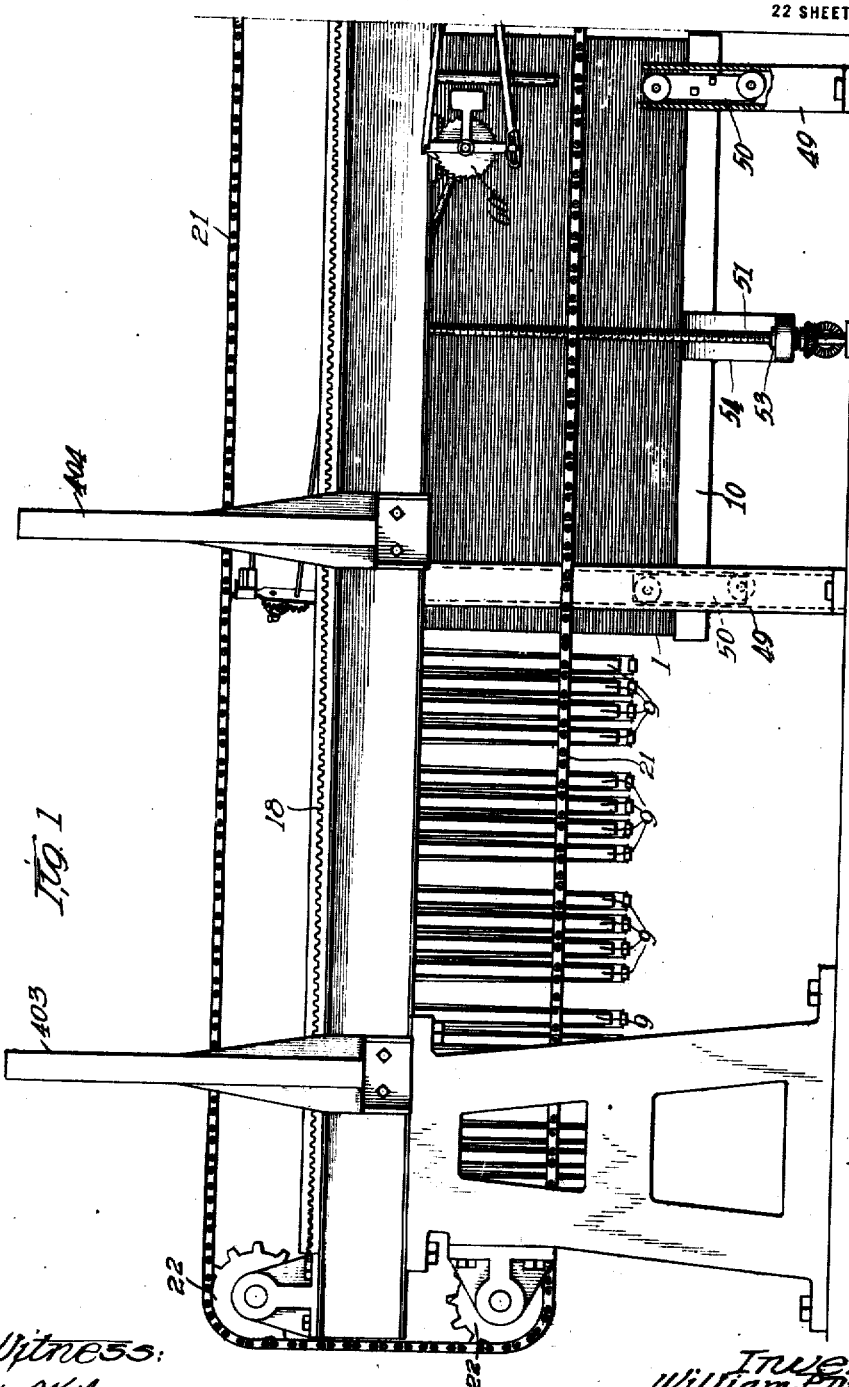

W. P. DUN LANY.
MACHINE FOR AFFIXING SAMPLES TO SHEETS.
APPLICATION FILED JULY 14, 1916.
1,327,665.
Patented Jan. 13, 1920.
22 SHEETS—SHEET 2.
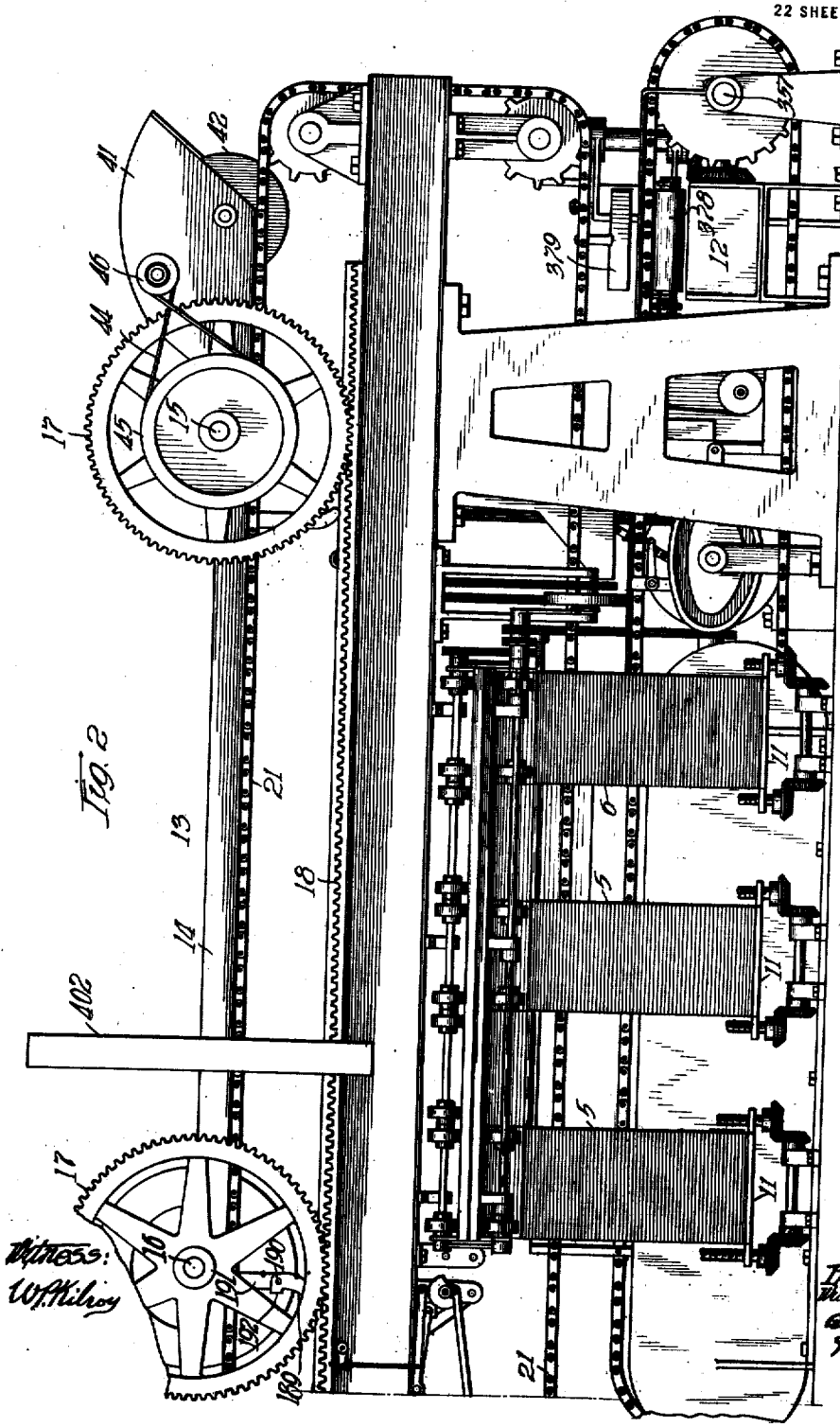

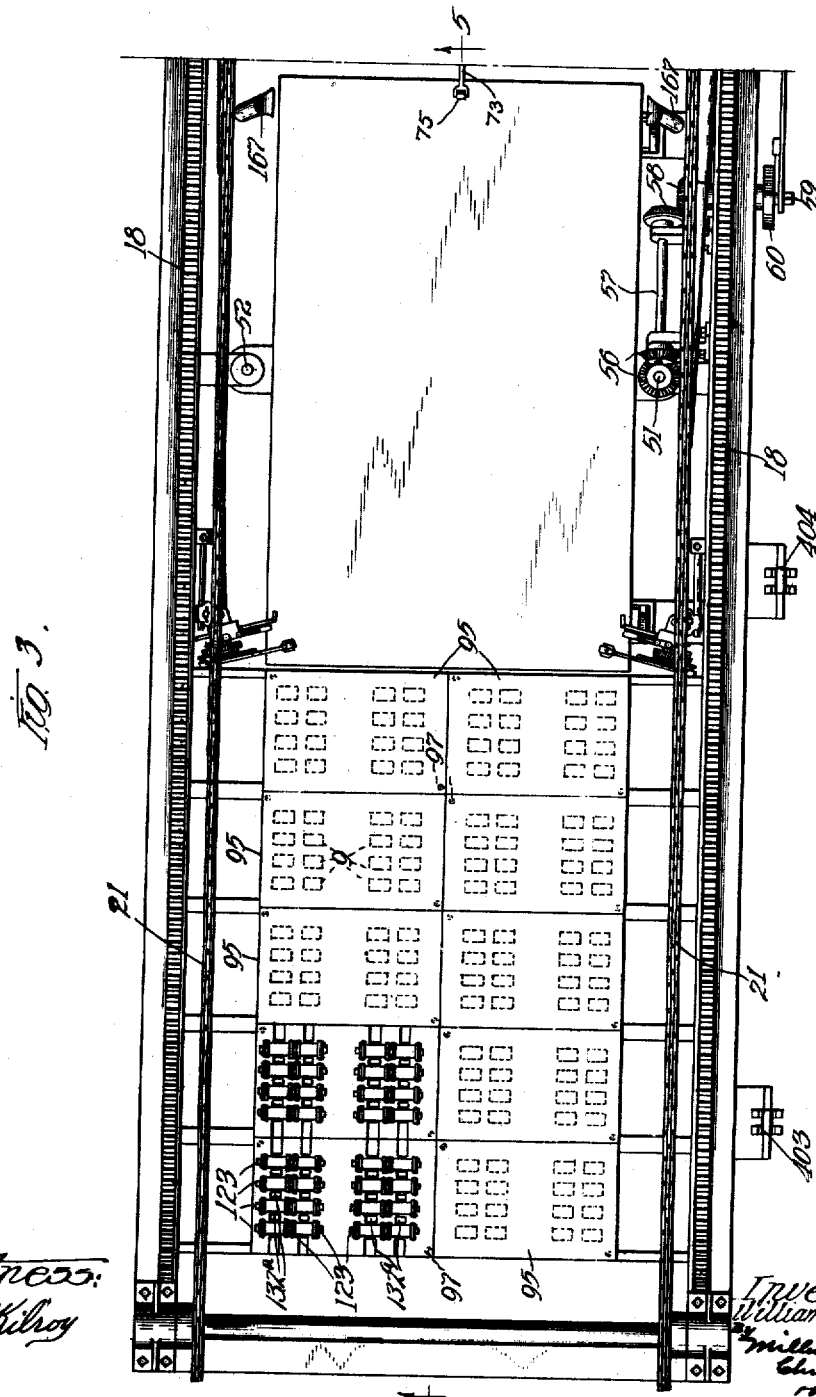

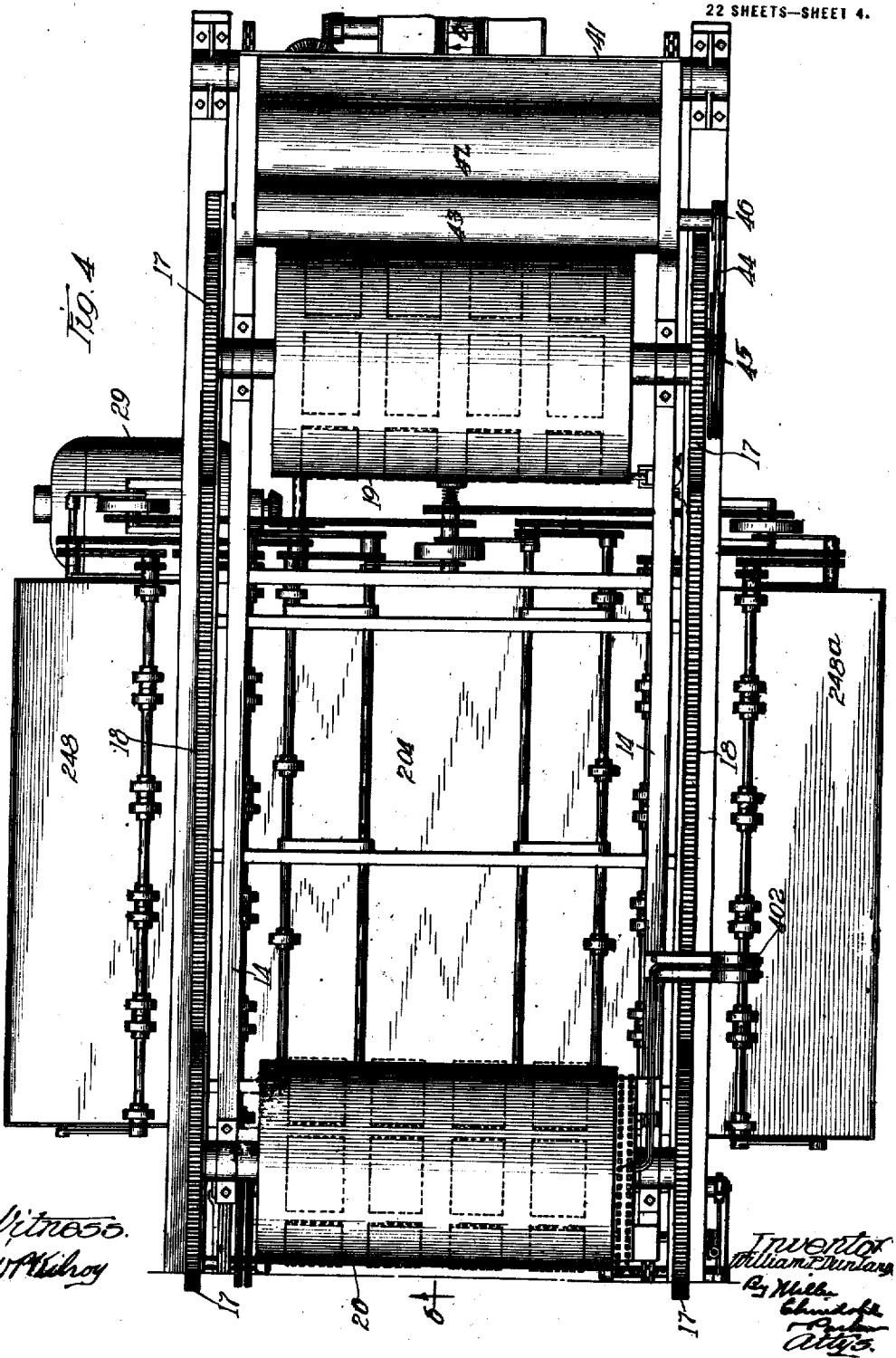

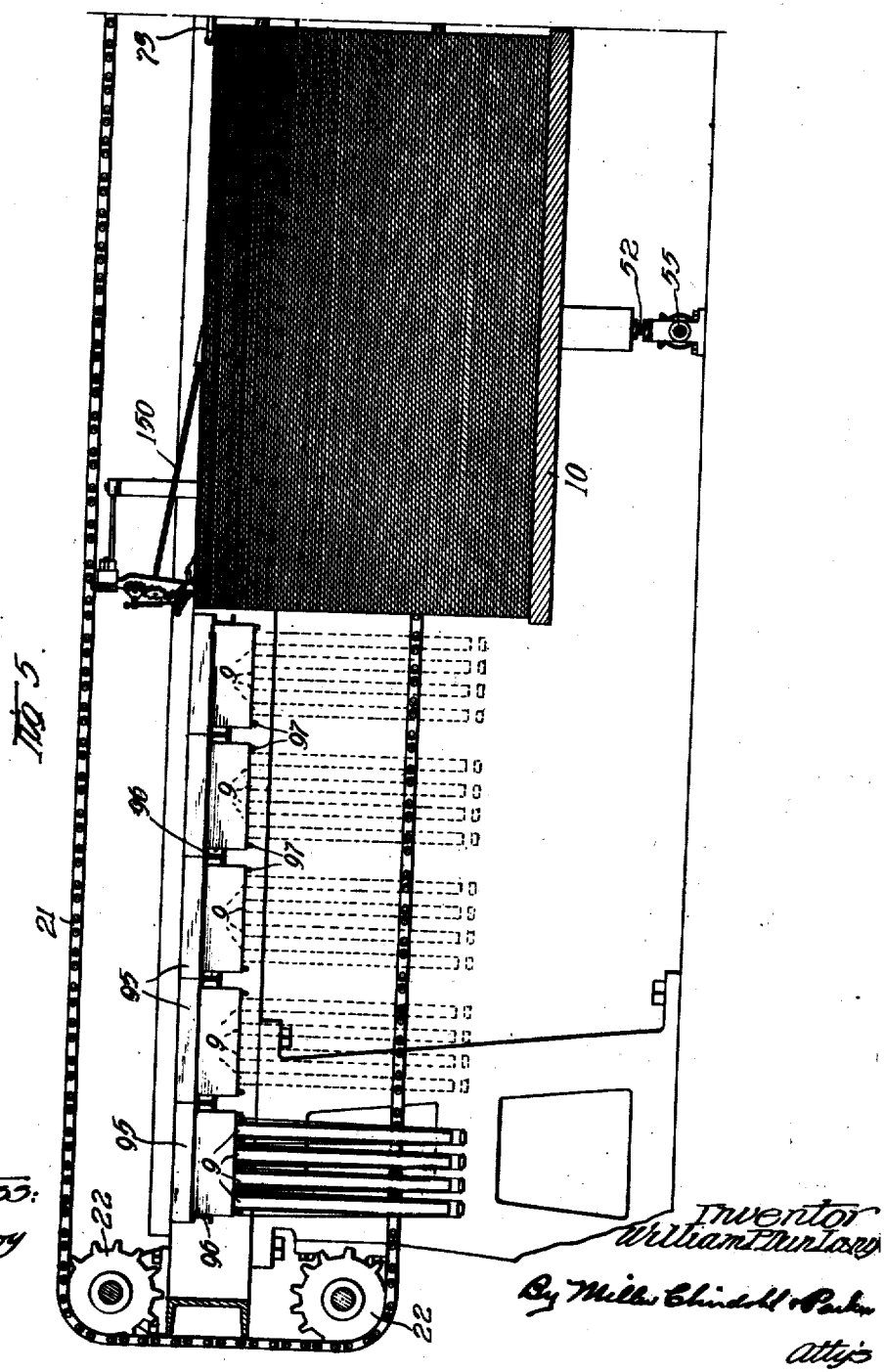

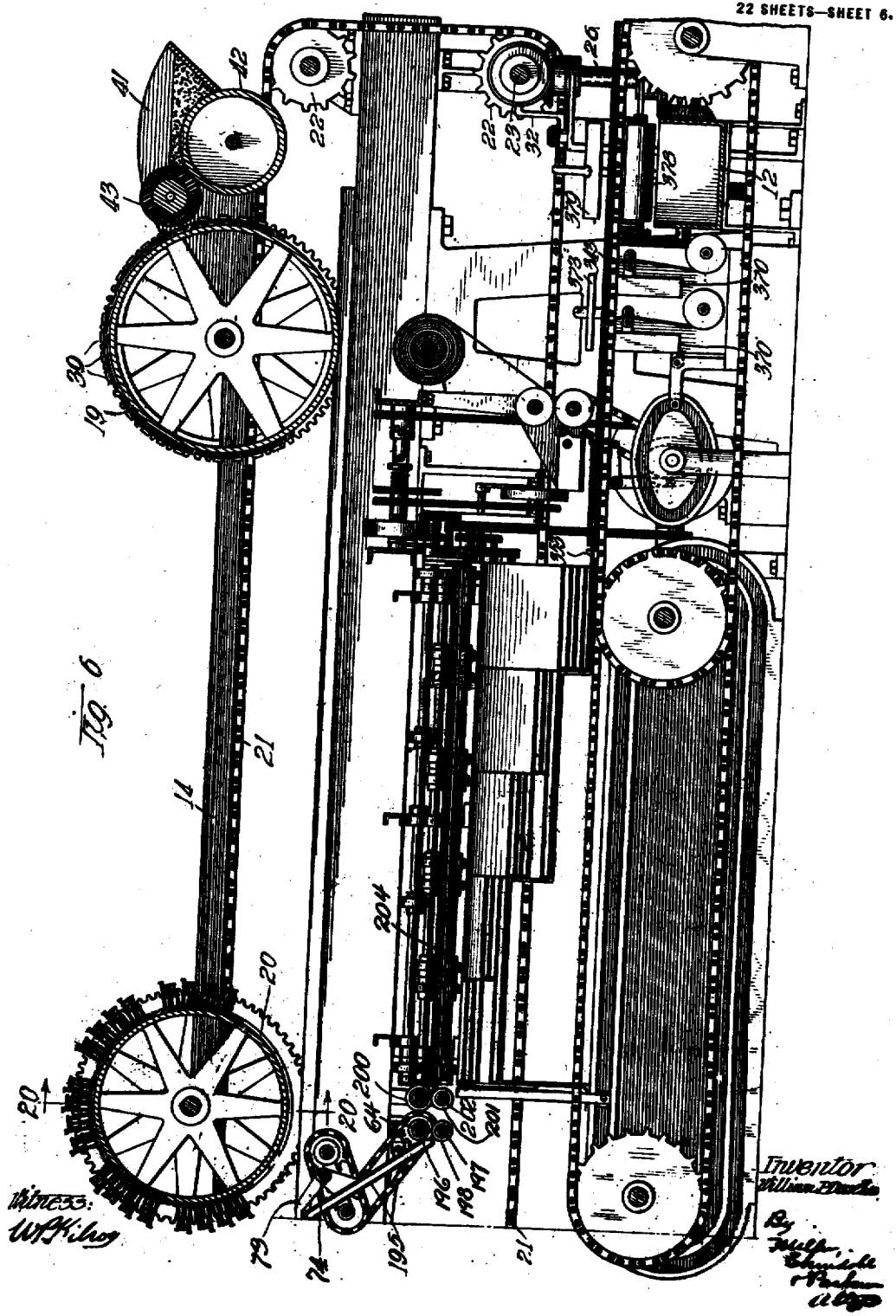

W. P. DUN LANY.
MACHINE FOR AFFIXING SAMPLES TO SHEETS.
APPLICATION FILED JULY 14, 1916.
1,327,665. Patented Jan. 13, 1920.
22 SHEETS—SHEET 7.
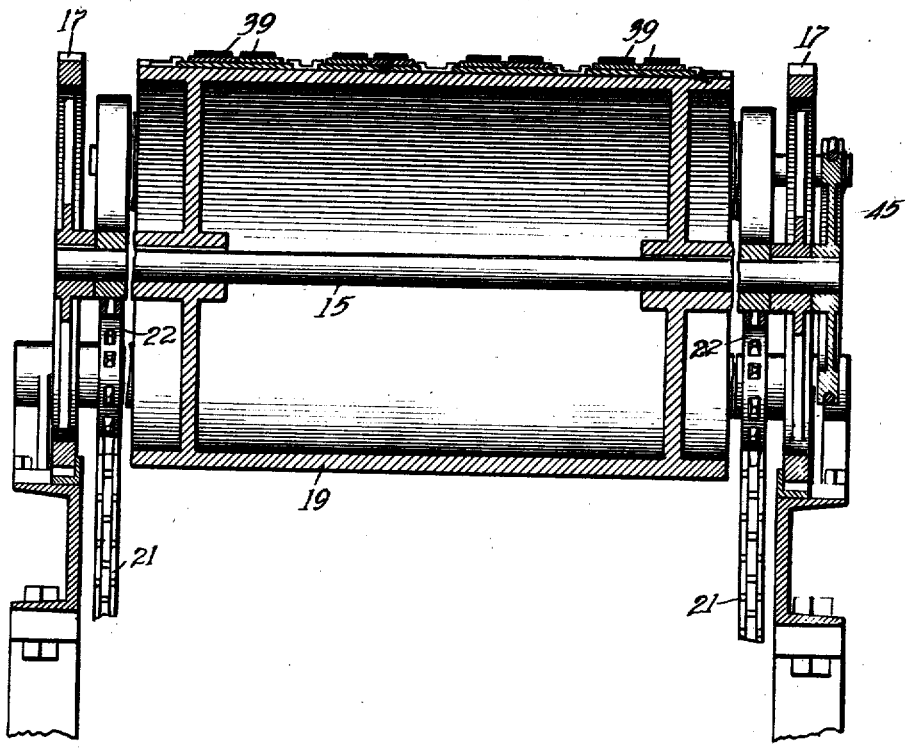
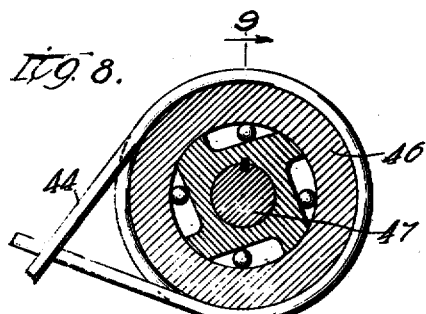
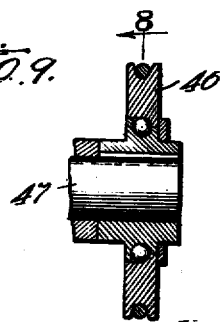

W. P. DUN LANY.
MACHINE FOR AFFIXING SAMPLES TO SHEETS.
APPLICATION FILED JULY 14, 1916.

1,327,665.

Patented Jan. 13, 1920.
22 SHEETS—SHEET 8.

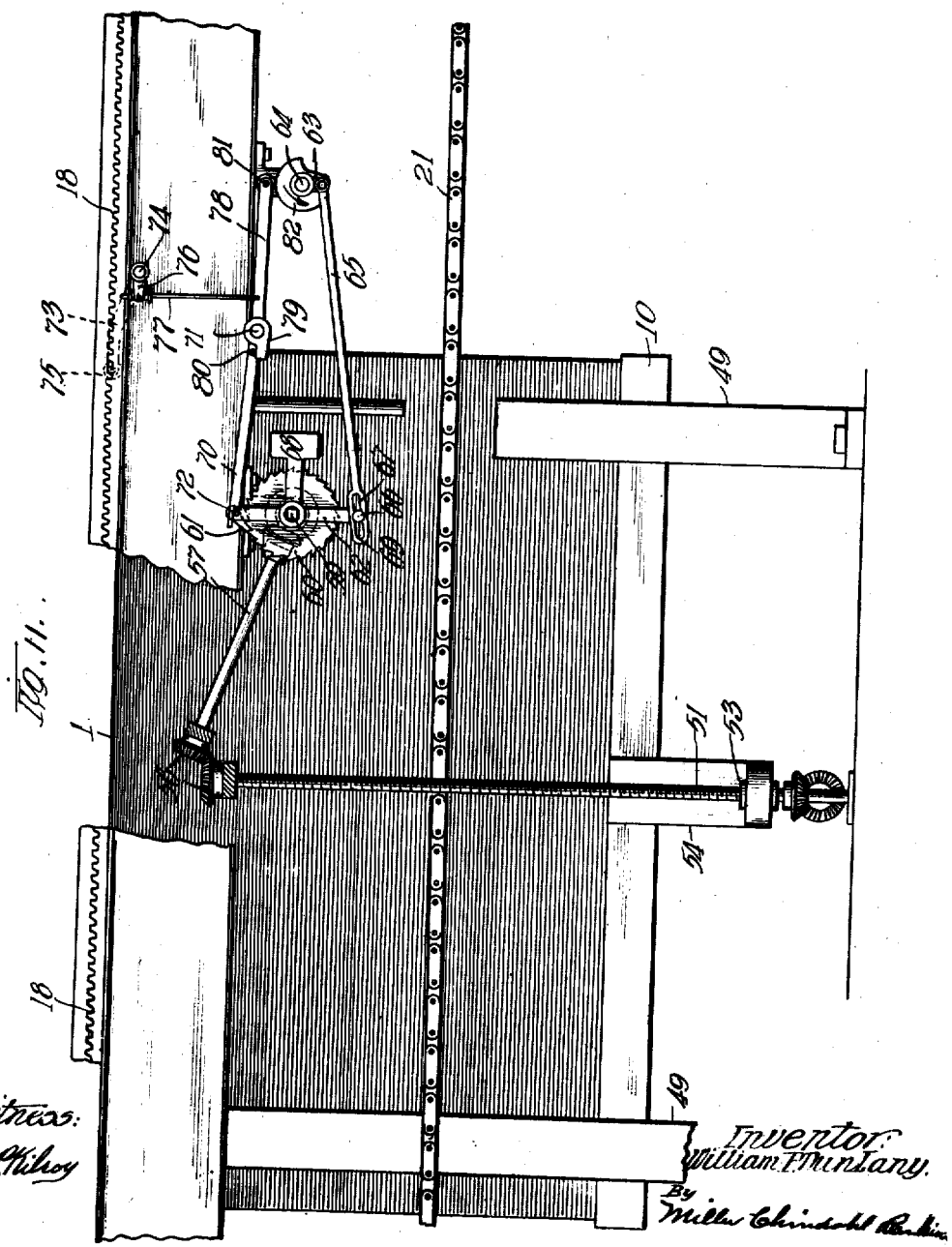

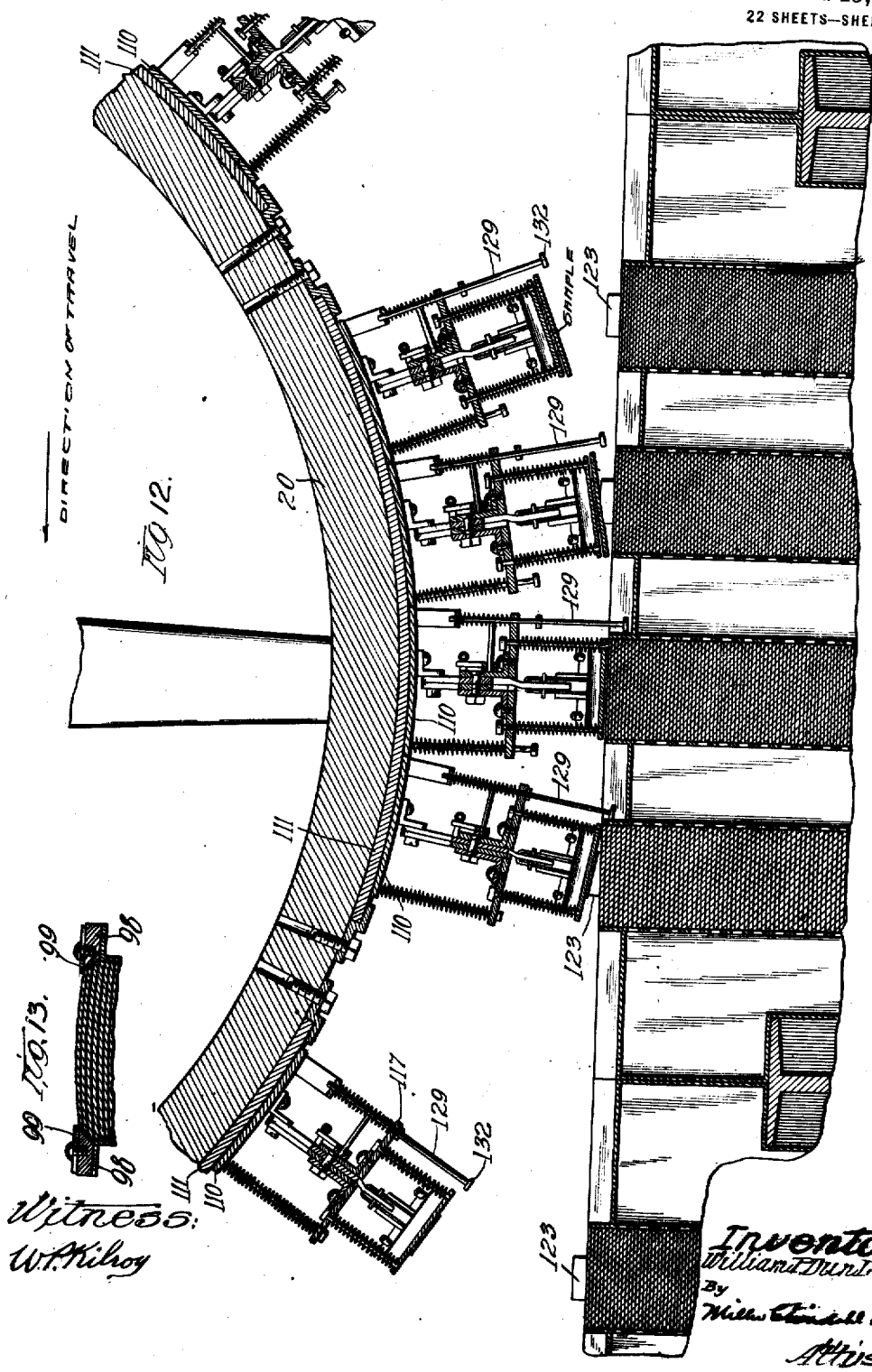

W. P. DUN LANY.
MACHINE FOR AFFIXING SAMPLES TO SHEETS.
APPLICATION FILED JULY 14, 1916.

1,327,665.

Patented Jan. 13, 1920.
22 SHEETS—SHEET 11.

Witness:
W. F. Kilroy

Inventor
William P. Dun Lany
By Miller, Chindahl, Parker
Attys

W. P. DUN LANY.
MACHINE FOR AFFIXING SAMPLES TO SHEETS.
APPLICATION FILED JULY 14, 1916.
1,327,665.
Patented Jan. 13, 1920.
22 SHEETS—SHEET 12.
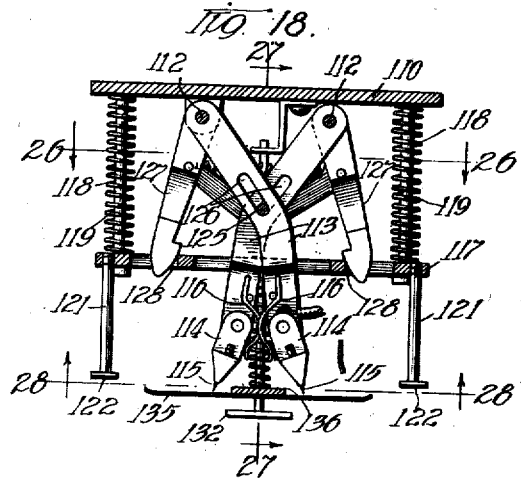
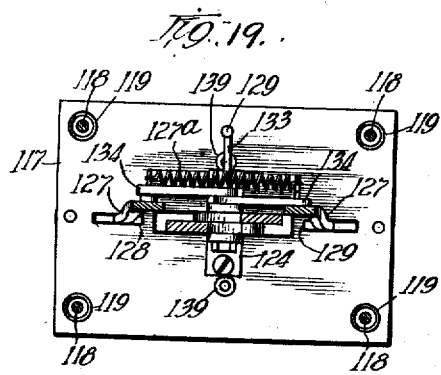
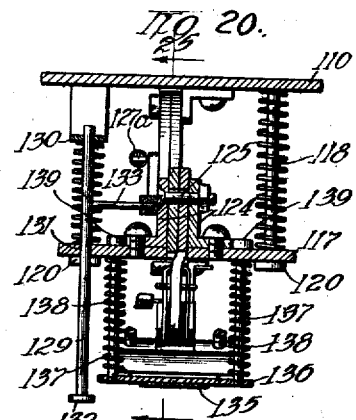
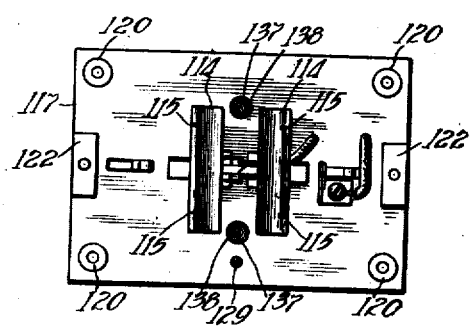
Witness:
W. P. Kilroy
Inventor:
William P. Dun Lany
By Miller Chindahl Parker
Atty's

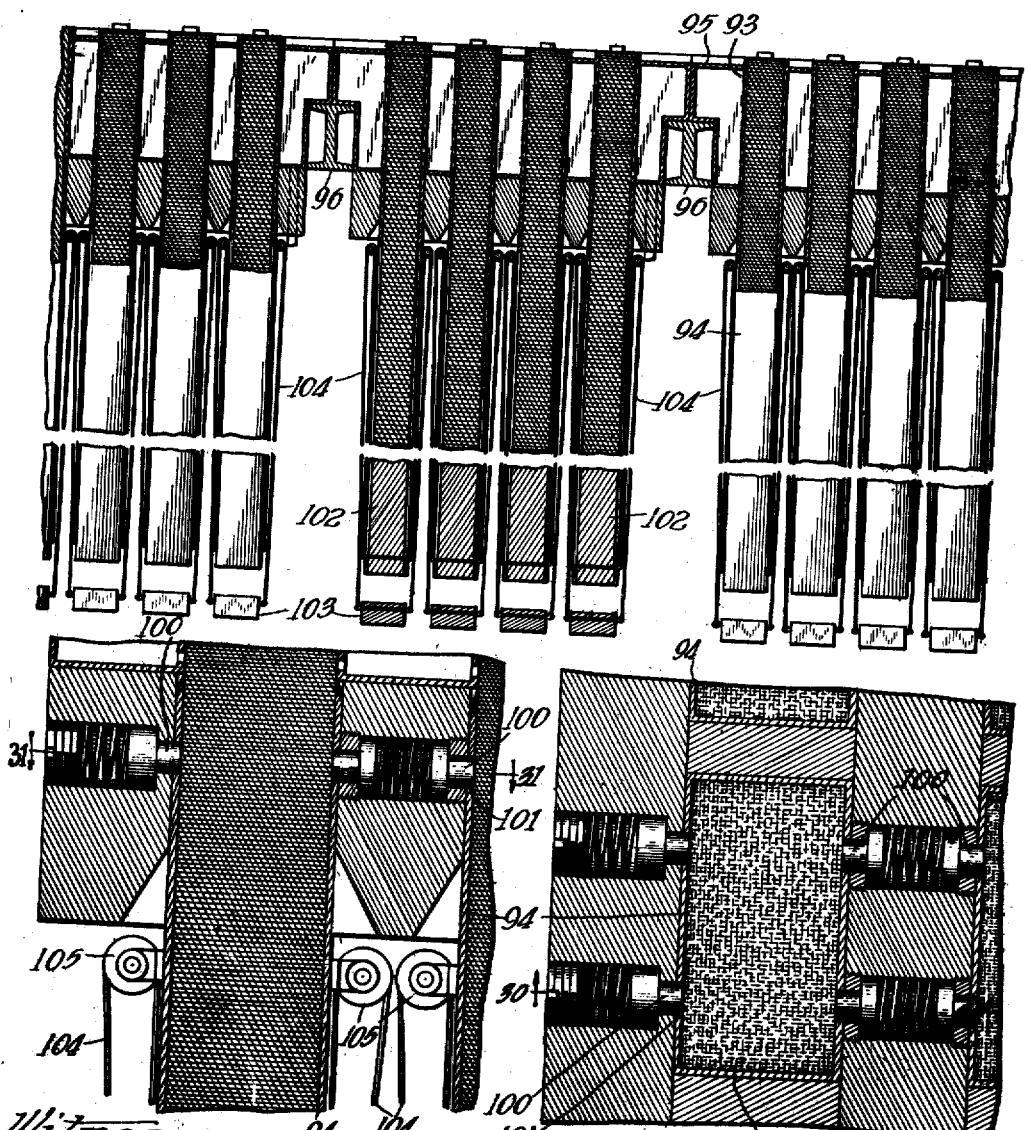

W. P. DUN LANY.
MACHINE FOR AFFIXING SAMPLES TO SHEETS.
APPLICATION FILED JULY 14, 1916.
1,327,665. Patented Jan. 13, 1920.
22 SHEETS—SHEET 14.
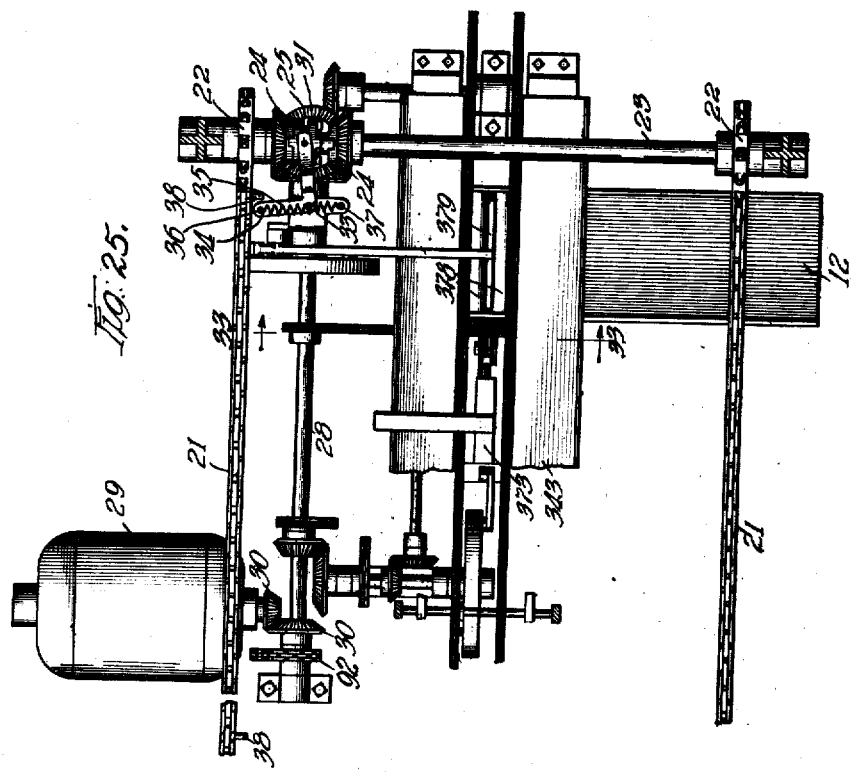
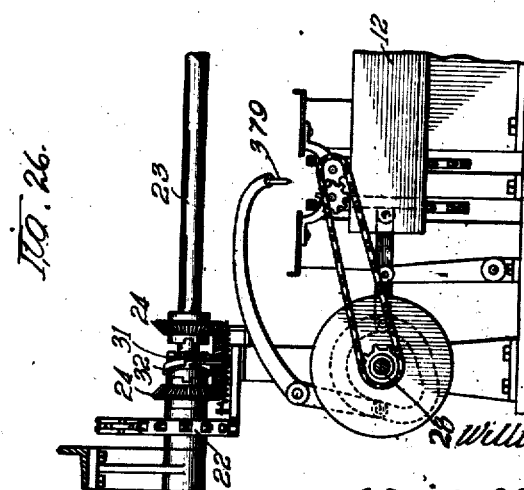
Witness:
W. P. Kilroy
Inventor
William P. Dunlany
By Miller Einsler Parker
Att'ys W. P. DUN LANY.
MACHINE FOR AFFIXING SAMPLES TO SHEETS.
APPLICATION FILED JULY 14, 1916.
1,327,665. Patented Jan. 13, 1920.
22 SHEETS—SHEET 15.
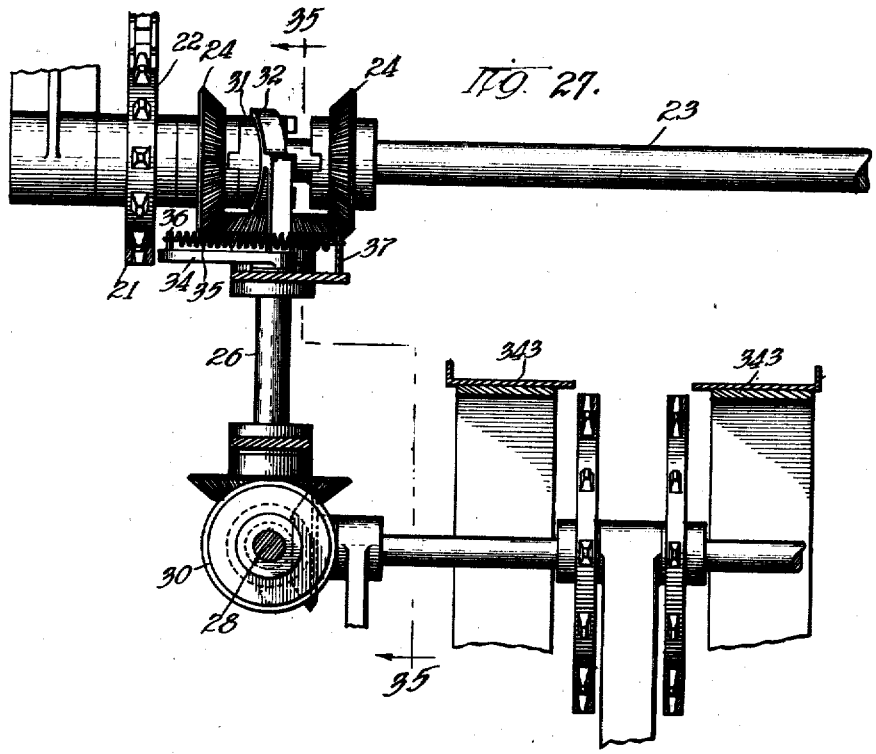
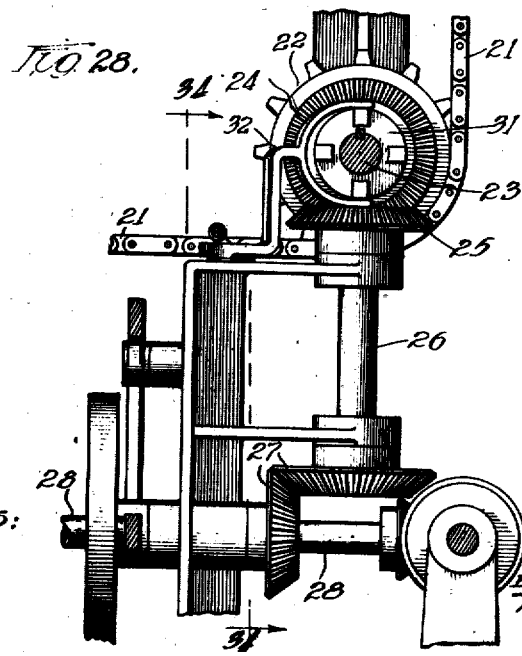
Witness:
W. P. Kilroy
Inventor:
William P. Dun Lany
By Miller Chindahl Parker
Att'ys

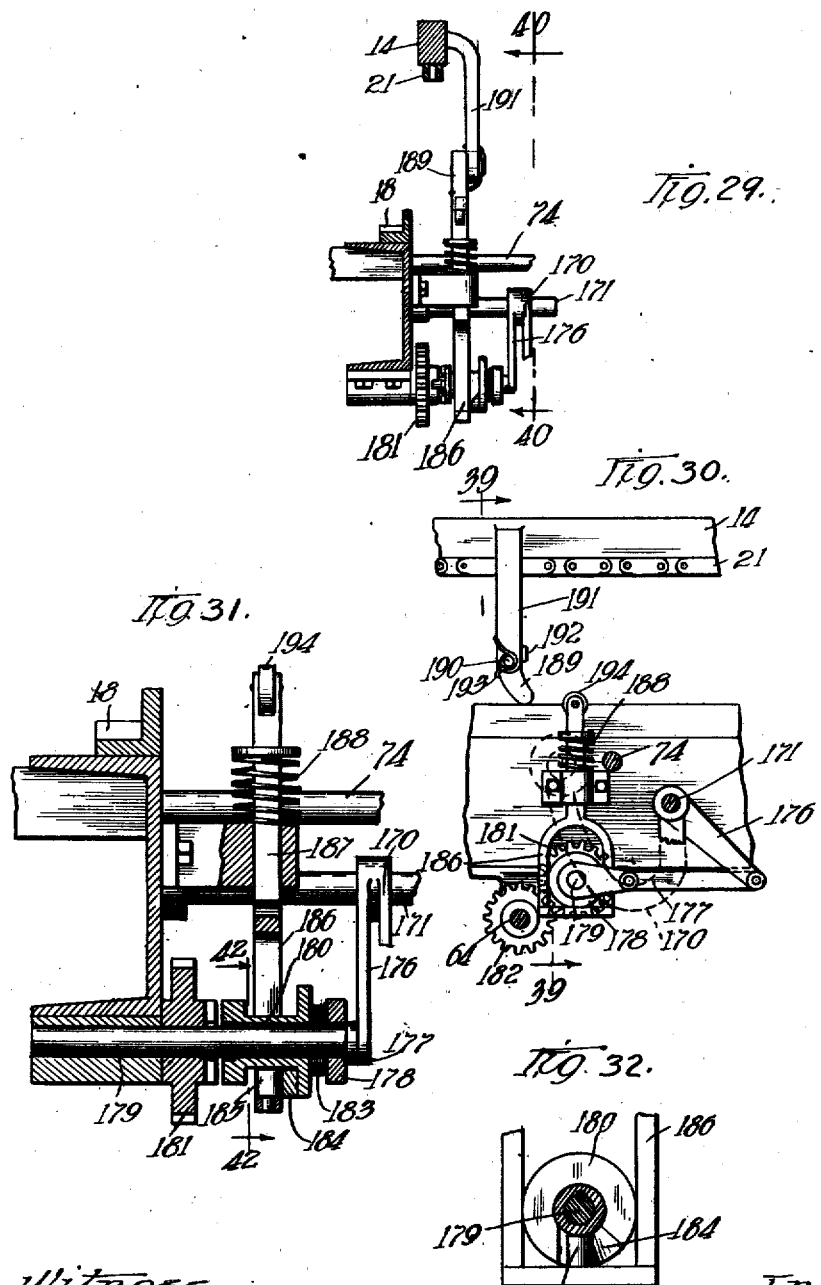

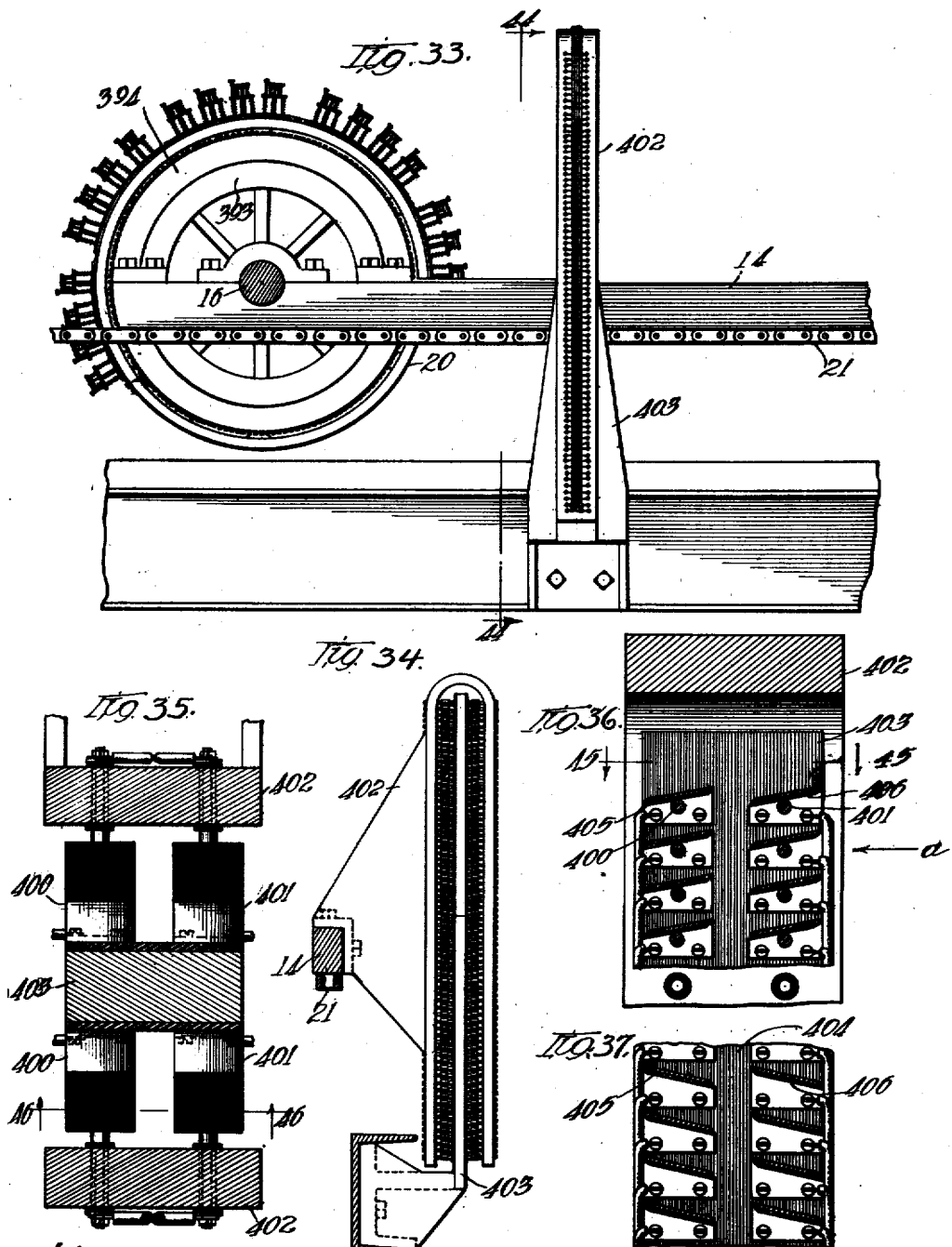

W. P. DUN LANY.
MACHINE FOR AFFIXING SAMPLES TO SHEETS.
APPLICATION FILED JULY 14, 1916.

1,327,665.

Patented Jan. 13, 1920.
22 SHEETS—SHEET 18.

Witness:
W. P. Kilroy

Inventor:
William P. Dun Lany.
By Miller Chadwick Parker
Attys.

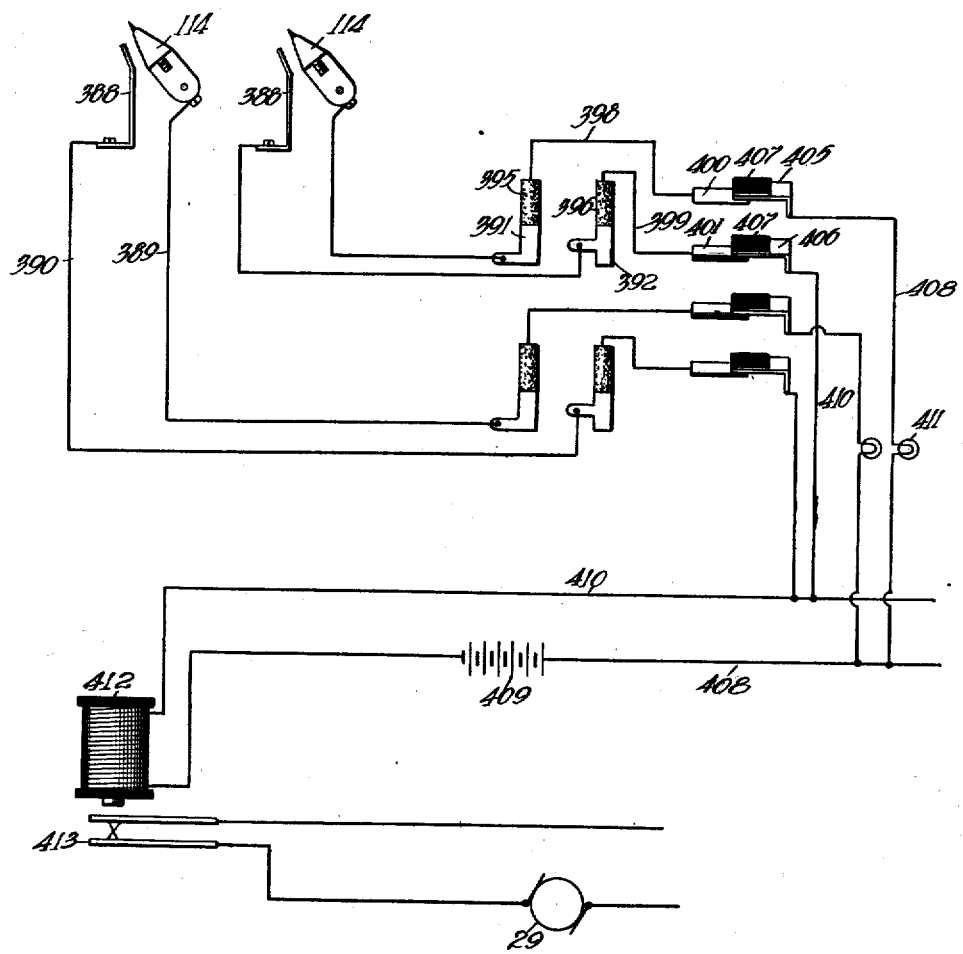

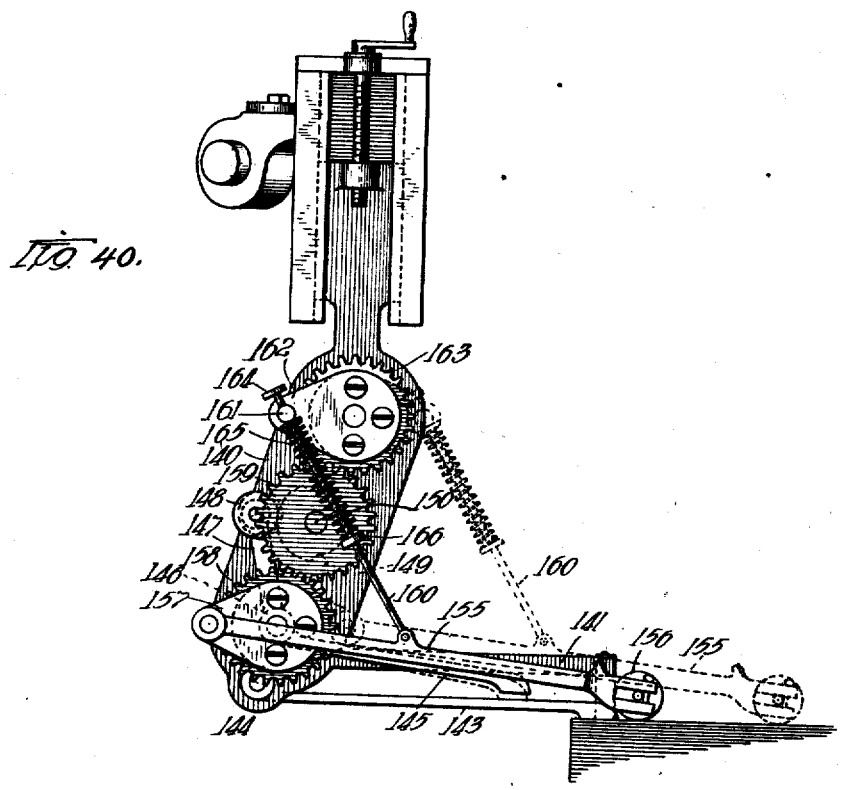
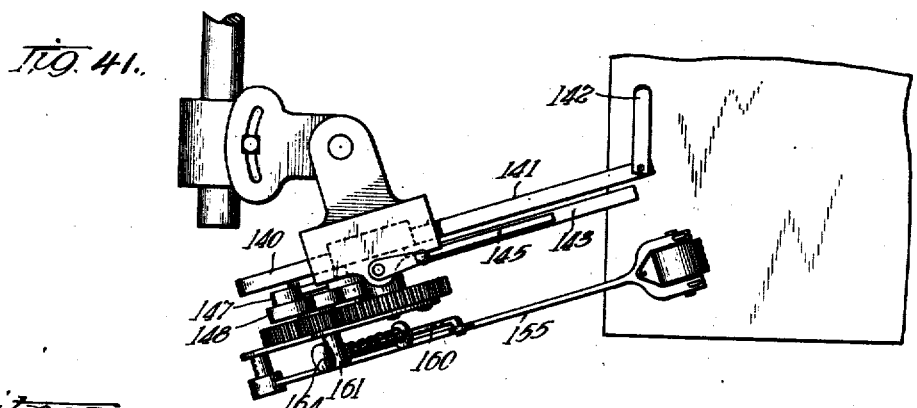

W. P. DUN LANY.
MACHINE FOR AFFIXING SAMPLES TO SHEETS.
APPLICATION FILED JULY 14, 1916.

1,327,665.

Patented Jan. 13, 1920.

22 SHEETS—SHEET 21.

UNITED STATES PATENT OFFICE.

WILLIAM P. DUN LANY, OF CHICAGO, ILLINOIS, ASSIGNOR TO SEARS, ROEBUCK AND COMPANY, OF CHICAGO, ILLINOIS, A CORPORATION OF NEW YORK.

MACHINE FOR AFFIXING SAMPLES TO SHEETS.

1,327,665.  Specification of Letters Patent.  Patented Jan. 13, 1920.

Application filed July 14, 1916. Serial No. 109,411.

*To all whom it may concern:*

Be it known that I, WILLIAM P. DUN LANY, a citizen of the United States, residing at Chicago, in the county of Cook and State of Illinois, have invented certain new and useful Improvements in Machines for Affixing Samples to Sheets, of which the following is a specification.

This invention relates to the automatic production of sheets or groups of sheets carrying samples of fabrics or other merchandise.

The invention has particular reference to a machine for pasting fabric samples upon a sheet of paper, and for cutting the sheet to form several sections, but the embodiment of the invention selected for illustration also includes means for gathering the sheets into a pile, together with a number of inserts and the cover; for fastening said sheets, inserts and cover together; and for folding the united sheets to form a book.

Figure 15:
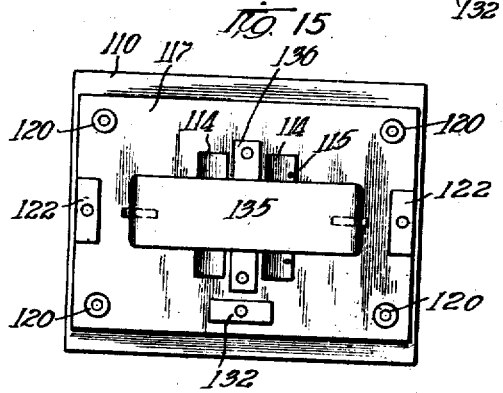
Figure 16:
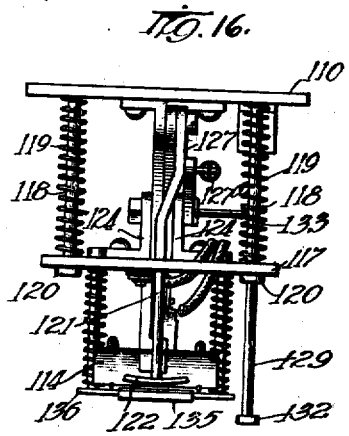
Figure 17:
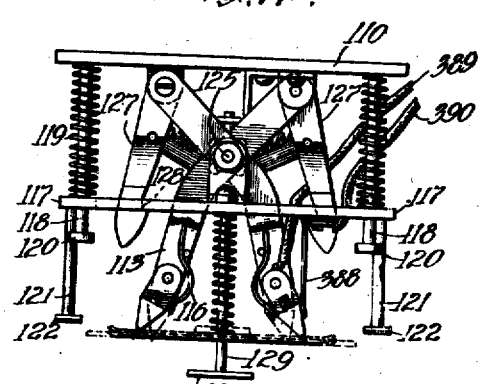
Figure 38:
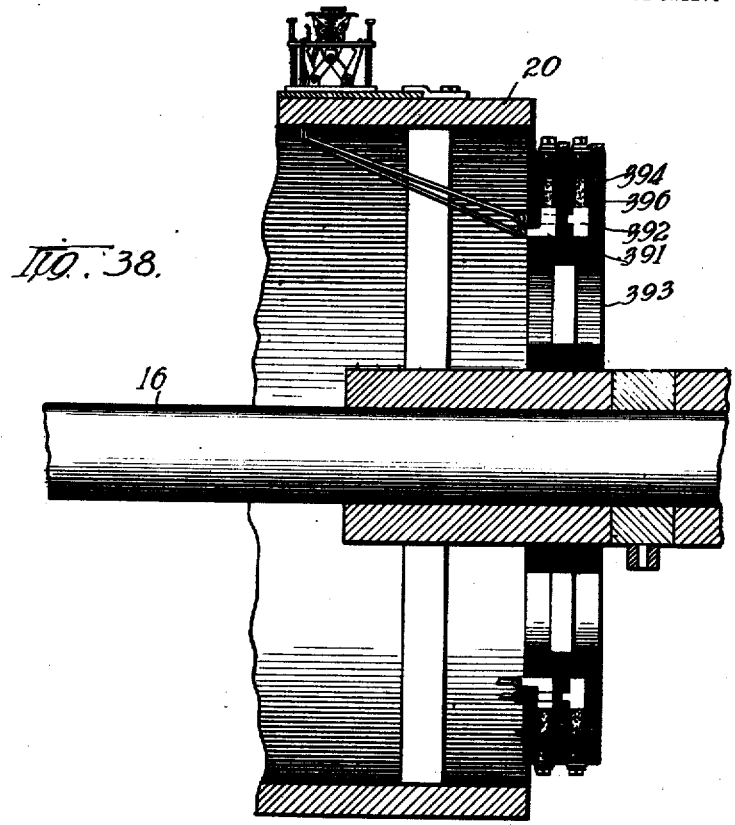
Figure 39:
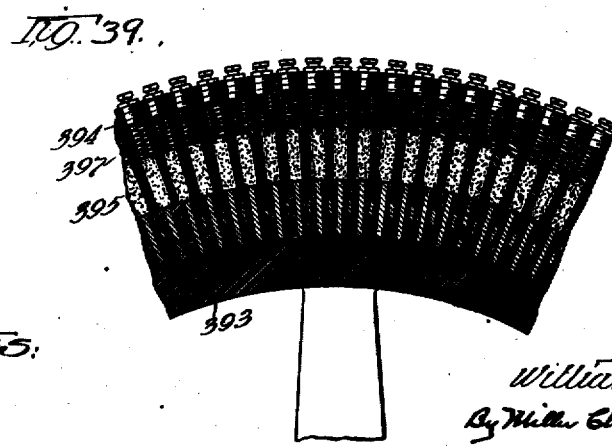
Figure 42:
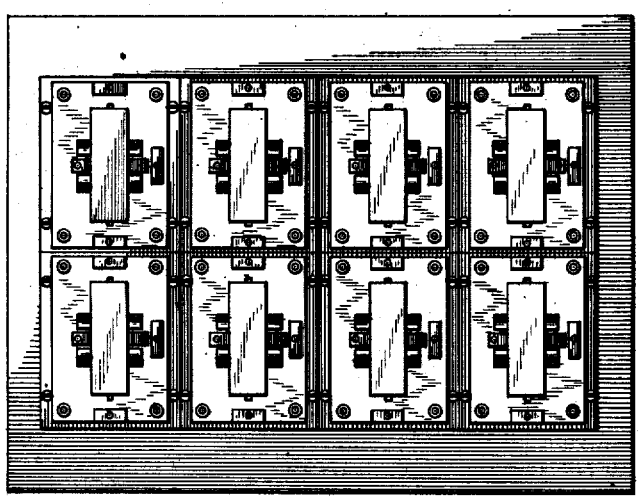
Figure 43:
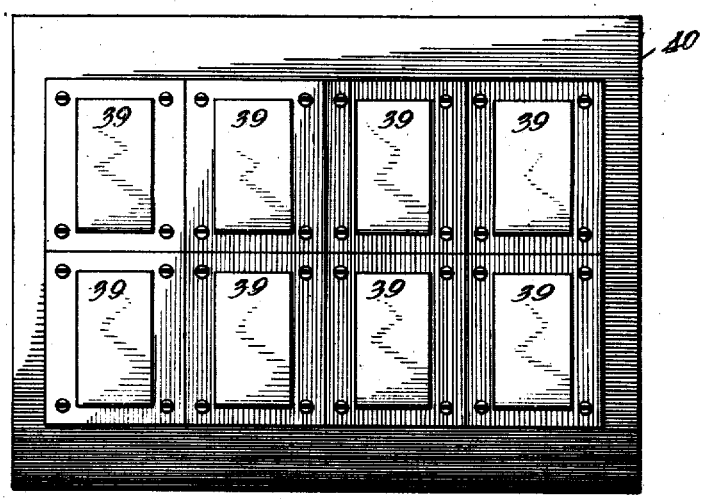
Figure 44:
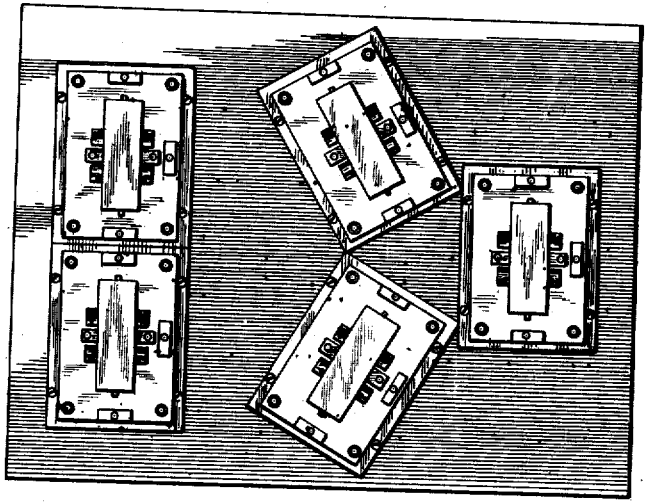
Figure 45:
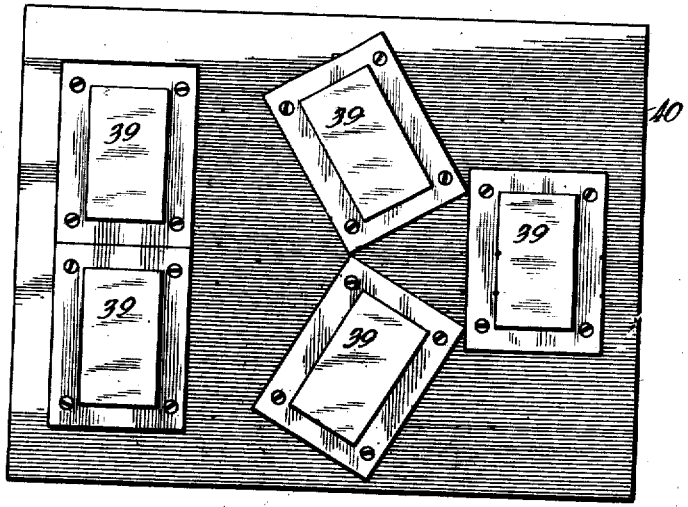

In the accompanying drawings, Figures 1 and 2 together constitute a side elevation of a machine embodying the features of my invention. Figs. 3 and 4 together form a top plan view of the machine. Figs. 5 and 6 together constitute a longitudinal sectional view of the machine. Fig. 7 is a fragmental transverse vertical sectional view through the means for applying adhesive material. Figs. 8 and 9 illustrate the drive for one of the rollers comprised in said adhesive-applying means, said views being taken in the planes of the section lines shown in said figures. Fig. 10 is a fragmental top plan view. Fig. 11 is a fragmental side elevation. Fig. 12 is a fragmental longitudinal sectional view through the devices for picking samples from the sample magazines. Fig. 13 is a fragmental sectional view of one of the sample magazines. Fig. 14 is a side elevation of one of the sample-pick-up devices. Fig. 15 is a plan view of said device. Fig. 16 is an end elevation of the device. Fig. 17 is a view similar to that of Fig. 14, but showing the position assumed when a sample is not picked up or is dropped after being picked up. Fig. 18 is a sectional view taken in the plane of line 25—25 of Fig. 20. Fig. 19 is a section on line 26—26 of Fig. 18. Fig. 20 is a section on line 27—27 of Fig. 18. Fig. 21 is a section on line 28—28 of Fig. 18. Fig. 22 is a sectional view illustrating some of the sample magazines. Fig. 23 is an enlarged sectional view of one of the sample magazines, the view being taken in the plane of line 30—30 of Fig. 24. Fig. 24 is a view on line 31—31 of Fig. 23. Fig. 25 is a fragmental top plan view illustrating certain of the driving mechanisms. Fig. 26 is a vertical sectional view taken in the plane of line 33—33 of Fig. 25. Fig. 27 is a view taken in the plane of dotted line 34—34 of Fig. 28. Fig. 28 is a section on line 35—35 of Fig. 27. Fig. 29 is a section on line 39—39 of Fig. 30. Fig. 30 is a section on line 40—40 of Fig. 29. Fig. 31 is an enlarged sectional view of certain parts shown in Fig. 29. Fig. 32 is a view on line 42—42 of Fig. 31. Fig. 33 is a fragmental side elevation of the means for picking up samples from the magazines and depositing them upon a sheet of paper or the like. Fig. 34 is a section on line 44—44 of Fig. 33. Fig. 35 is a section on line 45—45 of Fig. 36. Fig. 36 is a section on line 46—46 of Fig. 35. Fig. 37 is a view similar to that shown in Fig. 36 but illustrating a different contact post. Figs. 38 and 39 illustrate some of the devices comprised in the electric stop motion. Fig. 39ᵃ is a diagram illustrating the electric stop motion and signal means. Fig. 40 is a side elevation of certain paper-separating devices. Fig. 41 is a top plan view of said devices. Fig. 42 illustrates one of various possible arrangements of the sample-pick-up devices. Fig. 43 illustrates one of various possible arrangements of the adhesive-applying devices. Fig. 44 illustrates another arrangement of the sample-pick-up devices. Fig. 45 illustrates an alternative arrangement of the adhesive-applying devices.

Referring now to Figs. 1 and 2, which, as hereinbefore stated, together constitute a side elevation of the machine, the various sheets progress through the machine from left to right. The samples are stacked in a series of magazines 9.

Adhesive material is applied to the top sheet 1 and the samples deposited upon the coated portions of the sheet by means including a carriage 13, said carriage consisting of side bars 14 having bearings in which are mounted two axles 15 and 16. Upon these axles are fixed spur gear wheels 17 arranged to travel upon two racks 18 extending from one end of the machine to the other. Upon the axle 15 is fixed a drum 19 carrying means for depositing films of adhesive material upon the top sheet 1. Upon the shaft 16 is fixed a drum 20 carrying devices for picking up samples from the magazines 9 and depositing them upon said films of adhesive material. The means for reciprocating the carriage 13 to carry the drums 19 and 20 into and out of operative relation to the stack of sheets 1 and the magazines 9, respectively, comprises two endless chains 21 secured to the side bars 14 and running over sprocket wheels 22 carried by the supporting frame. Two of the sprocket wheels 22 are fixed upon a shaft 23 (Figs. 6 and 25). Loosely mounted upon the shaft 23 are two bevel gears 24 which are in mesh with a bevel gear 25 (Fig. 28). The gear 25 is fixed to the upper end of a shaft 26 which is driven through bevel gears 27 from a shaft 28. The shaft 28 in turn is continuously driven from a motor 29 (Fig. 25) through intermeshing gears 30.

The bevel gears 24 are alternately clutched to the shaft 23 by means of a clutch member 31 (Figs. 27 and 28). The clutch member 31 is splined to the shaft 23 so as to rotate therewith, but is slidable longitudinally of the shaft 23 into clutch engagement with either of the gears 24. The clutch member 31 is slid along the shaft 23 by means of a fork 32 pivoted at 33 (Fig. 25), said fork being rigid with an arm 34. A tension spring 35 strained between a pin 36 on the arm 34 and a stationary pin 37 tends to hold the arm 34 at either side of a straight line joining the points 33, 36 and 37. The arm 34 is moved from one side to the other of such line by means of two pins 38 carried by one of the chains 21, said pins being arranged to engage the arm 34. As soon as one of the pins 38 has moved the crank arm past dead center, the spring 35 completes the movement of the arm.

In Fig. 4 the adhesive-applying devices and the pick-up devices are indicated diagrammatically. The adhesive-applying devices are best shown in Figs. 6, 7 and 43. Groups of blocks 39 of any suitable material are fixed upon base plates 40, which base plates are secured in any suitable manner upon the periphery of the drum 19. The size and shape of the blocks 39 will vary with the size and shape of the samples to be operated upon; and the arrangement of the blocks 39 upon the base plates 40 will vary according to the desired arrangement of the samples upon the pages of the finished book. A few of the many possible arrangements are illustrated in Figs. 43 and 45.

Any suitable means may be employed for applying adhesive material to the blocks 39. Fig. 6 illustrates a font 41 located on the carriage 13 adjacent to the drum 19. Said font comprises a roller 42 and a ductor roller 43 with which the blocks 39 run in contact. The roller 43 may be rotated by any suitable means, as for example, a belt 44 running over grooved pulleys 45 and 46 mounted upon the axle 15 and the shaft 47 of the roller 43, respectively. (See Figs. 2 and 8). In the movement of the carriage 13 from right to left, the blocks 39 apply films of adhesive material to the top sheet 1. To prevent adhesive material from being applied to the blocks during the return movement of the carriage, and thus prevent an excessive application of adhesive to the sheet 1, I provide a one-way clutch 48 (Figs. 8 and 9) between the pulley 46 and the shaft 47.

The table 10 may be guided for vertical movement in any suitable manner, that herein shown consisting of two guide channels 49 (Fig. 1) fixed in the framework of the machine, and two roller shoes 50 fixed to the table 10 and traveling in said channels. The table is supported upon two vertical lead screws 51 and 52 (Figs. 10 and 11) one at each side of the table, said screws being suitably supported for rotation. Upon each screw is a nut 53 which is rotatably secured to a bracket 54 fixed to the table 10. The lead screws 51 and 52 are connected for simultaneous movement by means of a horizontal shaft 55 (Fig. 5) which is connected by means of bevel gears to the lower portions of the lead screws.

Any suitable means may be provided for rotating the lead screws 51 and 52. Herein I have shown the screw 51 as connected by means of bevel gears 56 (Fig. 11) with a shaft 57 which in turn is connected by means of bevel gears 58 (Fig. 10) to a shaft 59 (Fig. 11). A ratchet wheel 60 is fixed upon the shaft 59. The means for rotating the ratchet wheel 60 may be of any suitable construction. Herein is shown a common form of drive arranged to be controlled by the paper. A pawl 61 is pivoted upon a lever 62 which is pivoted upon the shaft 59. The lever 62 is swung in the direction to turn the ratchet wheel 60 by means of a crank arm 63 fixed on a shaft 64, said crank arm being connected by means of a link 65 with a pin 66 on the lower end of the lever 62. Said pin plays within an elongated opening 67 in the link. Suitable means, such as a weighted arm 68 which is rigid with the lever 62, tends to hold the pin 66 against the end wall 69 of the elongated opening 67 and to give the pawl 61 its return movement. A detent arm 70 (Fig. 11) is mounted upon a pivot 71. On the lever 62 is a pin 72 arranged to underlie the detent arm 70. The latter has a locking shoulder near its forward end, which locking shoulder is arranged to be engaged by the pin 72 to prevent a return movement of a pawl 61. Normally the detent arm 70 is in position to prevent the lever 62 from swinging, but when sheets 1 have been fed from the stack on the table 10 to such an extent that said table should be raised slightly, the detent arm 70 is lifted away from the pin 72. 73 is an arm fixed on a shaft 74 and carrying a roller 75 arranged to touch the top of the stack of sheets 1. Rigid with the shaft 74 is a crank arm 76 which is connected by means of a link 77 with an arm 78. The arm 78 is rotatably mounted on the pivot 71 and is rigid with an arm 79 that underlies a pin 80 set in the detent arm 70. The arm 78 carries a roller 81 that runs on a cam 82 fixed on the shaft 64. When the depression of the cam arrives opposite the roller 81, said roller descends far enough to raise the detent arm 70 clear of the pin 72 (unless the roller is prevented from doing so by the arm 73). At the time the pin 72 is released, the link 65 moves toward the left (Fig. 11), the weight 68 causing the stud 66 to lie against the end wall 69 of the slot 67, and the pawl 61 being drawn back over the ratchet wheel. When the movement of the link 65 is reversed, said link swings the lever 62, causing the pawl to turn the ratchet wheel and thus producing sufficient upward movement of the table 10 so that the roller 81 is prevented from descending into the depression of the cam when the depression again arrives opposite the roller 81. When one or more sheets have been removed from the table 10, the descending arm 73 again permits the pawl 61 to be actuated.

The shaft 64 is connected by means of a gear train 85 (Fig. 10) to a shaft 86, which latter shaft is connected by means of bevel gears 87 to a shaft 88. The shaft 88 is driven by the motor 29 through suitable gearing connections not shown.

When the table 10 is to be lowered, the pawl 61 is lifted from the ratchet wheel 60, a crank placed upon the squared outer end of the shaft 59, and said shaft rotated in the reverse direction.

Referring now to Figs. 3, 22, 23 and 24, the magazines 9 are arranged in groups in accordance with the grouping of the samples upon the pages of the finished book. In Fig. 3 some of the groups of magazines are indicated only in a diagrammatic manner. Each magazine comprises an upper tube-section 93 (Fig. 22) and a lower or main tube-section 94. The upper sections 93 of every two groups of magazines are contained within an air-tight box 95 (Figs. 3 and 22) which is supported in the machine frame upon the bars 96 (Fig. 22). The magazine-sections 93 have perforated side walls. Means of any suitable character may be provided to create a partial vacuum within the boxes 95 in order to withdraw lint from the edges of the samples contained within the magazine sections 93. Herein is shown nipples 97 (Figs. 3 and 5) located on the boxes 95 and adapted for connection to any convenient air-exhausting apparatus.

In order that the top sample in each magazine section 93 shall be properly presented to the sample-picking-up devices, the mouth of the tube is slightly reduced by providing at two opposite sides beveled elements 98 (Fig. 13), and by placing upon these elements plates 99 which are adjustable to overhang the elements 98 to a greater or less extent, depending upon the character of the samples.

The lower or main section 94 of the magazine consists of a tube which is detachably secured in the framework of the machine in alinement with the section 93 by any suitable means, as, for example, spring-pressed detents 100 (Figs. 23 and 24) engaging in openings 101 in said tubes. The ends of the detents are rounded; hence it will be seen that the tube 94 may be withdrawn downwardly by exerting sufficient force upon the tube to overcome the pressure of the detents. In the lower end of the tube 94 is a follower 102 upon which the stack of samples rests. A weight 103 attached to the follower by means of flexible connections 104 running over guides 105 urges the follower upwardly so as to hold the top sample pressed against the overhanging edges of the plates 99. The pressure of the column of samples against the reduced mouth of the magazine causes the upper sample or samples to bulge upwardly slightly, thus facilitating removal of the top sample.

The means for selecting samples singly and successively from the magazines 9 may be of any preferred construction; that used in the present embodiment is illustrated in Figs. 14 to 21, inclusive. For each magazine there is a device such as the one shown in the views referred to. Each device comprises a base plate 110 fixed upon a plate 111 (Fig. 12) which is secured in any suitable manner to the periphery of the drum 20. Upon the base plate 110 are pivoted at 112 (Fig. 18) two arms 113. To the free end of each arm 113 is pivoted a needle-holder 114 carrying a suitable number of needles 115, two being herein shown. (See the underside view, Fig. 21.) The needles 115 have a screw-thread connection with the needle-holders so that the needles may be made to project from the holders a distance suitable to the thickness or nature of the samples to be operated upon. Springs 116 tend to impart pivotal movement to the needle-holders with relation to the arms 113 and thus to move the needle-holders away from each other.

Means is provided to swing apart the arms 113 after the needles 115 have entered the sample in order to place tension upon the portion of the sample between the needles. The means herein shown for this purpose comprises a plate 117 which is mounted on four posts 118 to slide toward and away from the base plate 110. Compression springs 119 normally hold the plate 117 against the heads 120 of the posts 118. Fixed to opposite ends of the plate 117 are posts 121 provided with feet 122 arranged, in the revolution of the drum 20, to come into contact with the blocks 123 located at opposite sides of the mouth of the magazine (see Figs. 3 and 12). The height of the blocks 123 is such that when the feet 122 are pressed against said blocks, the plate 117 is moved toward the drum. Upon the plate 117 are fixed two brackets 124 (Fig. 20) that carry a pin 125, said pin extending through elongated openings or cam slots 126 in the arms 113. When the plate 117 is forced toward the base plate 110, the pin 125 causes the arms 113 to swing away from each other to place tension upon the sample.

In order to hold the arms 113 in their separated position until the sample has been carried to the film of adhesive upon which the sample is to be deposited, I provide two hooks or detents 127 pivoted upon the base plate and arranged to engage shoulders 128 upon the plate 117. (See Fig. 17.) A tension spring 127ª tends to swing the hooks 127 toward each other. The means for moving the hooks away from each other to release the plate 117 comprises a stem 129 (Fig. 20) slidably mounted at 130 and 131 for longitudinal movement toward and away from the base plate 110. Upon the lower end of the stem 129 is a foot 132 arranged, in the rotation of the drum 20, to come in contact with the top sheet 1. To the stem 129 is rigidly fixed a pin 133 (Fig. 20) which is connected by means of links 134 to the locking hooks 127. It will be seen that when the stem 129 is forced toward the base plate 110, the hooks 127 will be swung away from each other and out of engagement with the locking shoulders 128, thereby releasing the plate 117, whereupon the springs 119 move said plate downwardly and thus swing the arms 113 toward each other to release the sample. Recesses 132ª are provided adjacent to the magazines 9 and in the path of the feet 132, so that said feet shall not come into contact with any surface except the top sheet 1.

Means is provided for pressing the released sample against the film of adhesive material. Said means comprises a plate 135 (Fig. 14) fixed to a cross-bar 136 (Fig. 20) that is secured to the lower ends of two posts 137. Said posts are slidably carried by the plate 117. Compression springs 138 interposed between the cross-bar 136 and the plate 117 normally hold the presser plate 135 in the position shown in Figs. 18 and 20, the action of the springs being limited by the heads 139 of the posts 137 impinging upon the upper side of the plate 117. The springs 138 are not strong enough to strip the sample from the needles 115 while the latter are exerting tension upon the sample.

The means for separating the top sheet 1 from the stack upon the table 10 may be of any ordinary or preferred construction. Herein are shown two groups of devices located at the rear corners of the sheet. One of said groups is illustrated in Figs. 40 and 41. It comprises a supporting bracket 140. Rigid with said bracket is an arm 141 provided with a spring finger 142 that bears upon the top sheet near one edge thereof. An arm 143 is pivoted to the bracket 140 at 144, the free end of which arm rests upon the top sheet near one side edge thereof. To increase the pressure of the arm 143 at times there is provided an arm 145 pivoted at 146, the free end of said arm overlying the arm 143. Rigid with the arm 145 is an arm 147 carrying a roller 148 that runs in contact with a cam 149 rotatably mounted on the bracket 140. The shaft that drives the cam 149 is made extensible in order that the group of paper-separating devices may be adjusted in position to correspond with variations in the sizes of the sheets operated upon. Herein the extensible shaft is shown as comprising telescoping sections 150, 151 and 152 (Fig. 10), which sections are splined together for simultaneous rotation. The cam 149 is fixed to the shaft-section 150. The shaft-section 152 is connected by means of a universal joint 153 to a shaft carrying a worm wheel 154, which worm wheel meshes with a worm (not shown) located upon the shaft 64.

To buckle the corner portion of the top sheet, there is provided an arm 155 having a roller 156 that rests upon the top sheet. The arm 155 is pivoted to a crank arm 157 which is fixed with relation to a gear wheel 158 rotatably supported upon the bracket 140. The gear wheel 158 meshes with a gear wheel 159 which is rigid with the shaft-section 150. To raise and lower the roller 156 into and out of contact with the top sheet, and to press said roller against the top sheet, there is provided a link 160 connecting the arm 155 to a pin 161 rotatably carried by a crank arm 162, said crank arm being rigid with a gear wheel 163 that meshes with the gear wheel 159. The link 160 passes slidably through the pin 161. Upon the upper end of the link 160 is a head 164, which is engaged by the pin 161 in the upper swing of the crank arm 162 to lift the roller 156 off the paper. The downward pressure of the pin 161 is yieldingly transmitted to the link 160 through a compression spring 165 which is interposed between a fixed collar 166 on the link 160 and a washer slidable on said link adjacent to the pin 161.

To assist in separating the top sheet from the sheet next below it, suitable means may be provided, as for example, two nozzles 167 (Fig. 10) located adjacent to the forward corners of the sheet and arranged to direct a current of air against the side edges of the upper sheets.

The means for removing the top sheet from the stack upon the table 10 comprises a shaft 168 (Fig. 10) extending transversely of the sheet and rotatably supported in arms 169 and 170. These arms are fixed upon a rock shaft 171 journaled in the supporting frame. As indicated in Fig. 30, the arm 170 is curved to clear the shaft 74.

Upon the shaft 168 is fixed a suitable number of paper-feeding rollers 172. The shaft 168 is rotated by means of a sprocket chain 173 running over two sprocket wheels, one of which is fixed upon the shaft 168 and the other of which is rotatably mounted upon the rock shaft 171. Rigid with the last mentioned sprocket wheel is a sprocket wheel carrying a chain 174 that runs around a sprocket wheel 175 which is fixed upon the constantly-rotating shaft 64.

The shaft 171 is rocked to swing the rollers 172 into and out of contact with the top sheet by means of a crank arm 176 (Fig. 30) which is fixed with relation to the rock shaft 171 and is connected by means of a link 177 to a crank arm 178. The crank arm 178 is fixed upon a shaft 179 rotatably mounted in a suitable bearing in the machine framework. A clutch member 180 is slidably mounted upon the shaft 179 and is splined thereto. Said clutch member is arranged to engage a clutch face upon a gear wheel 181 which is loosely mounted upon the shaft 179. The gear wheel 181 meshes with a gear wheel 182 on the constantly-rotating shaft 64. A compression spring 183 tends to move the clutch member 180 into engagement with the gear wheel 181. The clutch member 180 is provided with a cam 184 which is arranged to operate against an antifriction roller 185 carried by a yoke 186. Said yoke has a stem 187 that is supported for vertical reciprocation. A compression spring 188 normally holds the yoke 186 elevated so that the roller 185 lies in the path of movement of the cam 184. When the yoke is depressed so as to carry the roller 185 below the cam 184, the spring 183 pushes the clutch member 180 into engagement with the gear wheel 181. The yoke 186 is then released to upward movement to place the roller 185 in the path of the cam 184. As the clutch member 180 is completing one revolution, the cam 184 rides up on the roller 185, whereby the clutch member 180 is moved away from the gear wheel 181 and the crank arm 178 comes to rest in the position shown in Fig. 31.

The means for depressing the yoke 186 comprises a foot 189 pivoted at 190 to the lower end of a bracket 191 fixed to one of the side bars 14 of the carriage 13. 192 is a stop lug on the foot 189 to limit pivotal movement in one direction. A spring 193 yieldingly holds the foot in normal position. Upon the upper end of the stem 187 is an antifriction roller 194 arranged in the path of movement of the foot 189. As the carriage 13 is coming to rest, after having placed samples upon the top sheet of paper, the foot 189 is carried against the roller 194 and thereby depresses said roller to release the clutch member 180 to action. As soon as the foot 189 has passed the roller 194, the spring 188 restores the yoke 186 to normal position. When the carriage 13 is traveling in the opposite direction, the foot 189 swings upon its pivot 190 to pass the roller 194 without depressing the latter.

When the rollers 172 are placed in contact with the top sheet, they feed said sheet forward into a chute 195 (Figs. 6 and 14), the mouth of which chute is located close to the forward end of the top sheet of the stack upon the table 10. At the lower end of the chutte are feed rollers 196 (Fig. 6) fixed upon the shaft 64. Directly below the shaft 64 is a shaft 197 carrying feed rollers 198. The shaft 197 is driven from the shaft 64 through intermeshing gears 199 (Fig. 10). The rollers 196 and 198 feed the sheet to a cutting device consisting of a knife disk 200 fixed upon the shaft 86. The edge of the knife runs in a peripheral groove (not shown) in a drum 201 (Fig. 6) fixed upon a shaft 202. The shaft 202 is driven from the shaft 200 through intermeshing gears 203 (Fig. 10). The knife 200 severs the sheet 1 into two longitudinal halves which are fed forward onto a table 204 Figs. 4 and 6. From the table 204 the severed portions of the sheet are in condition to be made into book form. Any suitable means may be employed for this purpose. Herein the sheets are fed in opposite directions laterally of the machine onto tables 248 and 248ᵃ on opposite sides of the machine. From these tables the sheets are fed, together with inserts 5 and covers 6 (Fig. 2) supported by tables 11, onto a series of assembling shelves (Fig. 6) centrally of the machine, the sheets being further divided in such movement into a plurality of sections. From said shelves the sheet sections, inserts, and covers are moved onto a table 343 (Fig. 6). Suitable mechanism then moves the stack of sheets into operative relation with stapling means including a stapling head 370 and an anvil 373; and after being stapled the sheets are forwarded beneath the folding blade 379 and forced between rollers 378 into a receiving chute 12.

In order to stop the machine in case any one of the pick-up devices fails to pick up a sample or drops a sample after having picked it up, and to notify the operator of the location of the trouble, I provide means to be now described. Referring to Figs. 14 and 17, if the needles 115 fail to pick up a sample when the needles are carried into register with their particular magazine, the separating movement of the arms 113 due to the contact of the feet 122 with the blocks 123 will carry one of the needle-holders 114 into electrical contact with a contact spring 388, as shown in Fig. 17. Said needle-holder and the contact spring 388 are connected by means of wires 389 and 390 with contacts 391 and 392, respectively. (See Figs. 38 and 39ᵃ). The contacts 391 and 392 are located upon the periphery of a drum 393 which is fixed to the drum 20 and is concentric therewith. A ring 394 surrounds the drum 393 and is fixed to the carriage 13. The ring 394 carries carbon brushes 395 and 396 (Fig. 39ᵃ) which are held in contact with the periphery of the drum 393 by means of springs 397 (Fig. 39). The brushes 395 and 396 are connected by means of wires 398 and 399 with contact pins 400 and 401 mounted upon a bracket 402 (Figs. 4, 33 and 34) which is fixed to one of the side bars 14 of the carriage 13. Fixed upon the framework of the machine are two posts 403 and 404 (Figs. 1, 33 and 34) carrying contacts 405 and 406 arranged to be engaged by the pins 400 and 401. The contacts 405 and 406 are omitted in Fig. 1. They are of the form shown in Figs. 36 and 39ᵃ and are placed at an angle, as shown in Fig. 36. On the upper sides of the contacts 405 and 406 is placed insulation 407. The contacts 405 and 406 are of spring metal and therefore flexible. When the pins 400 are 401 are moved in the direction indicated by the arrow *a* in Fig. 36, said pins make contact with the lower sides of the contacts 405 and 406. When the pins move in the opposite direction they pass over the upper insulated sides of the contacts 405 and 406. As will be seen by a comparison of Figs. 36 and 37, the contacts 400 and 401 upon the post 403 are inclined oppositely to those upon the post 404. Hence the pins 400 and 401 make electrical contact with the contacts upon the posts 403 when moving in one direction and make electrical connection with the contacts 405 and 406 upon the post 404 when traveling in the opposite direction.

The contacts 405 are connected by means of a wire 408 with one terminal of a battery 409. The contact 406 is connected by means of a wire 410 with the other terminal of said battery. Included in the battery circuit is a lamp 411 and an electromagnet 412. The lamp may be located at any convenient point. The magnet 412 is arranged to operate a circuit-breaker 413 included in the circuit of the motor 29.

The operation is as follows: When the carriage 13 travels toward the left (Fig. 1) into position over the magazines 9 the pick-up devices pick up a sample from each of said magazines. Upon the completion of such leftward movement of the carriage, the contact pins 400 and 401 upon the bracket 402 are in contact with the contacts 405 and 406 upon the post 403, and the contacts 391 and 392 are in engagement with the brushes 395 and 396. If any one of the pick-up devices has failed to pick up a sample, one of the needle-holders 114 of such pick-up device will be in contact with its spring 388 and a circuit will be closed through the lamp 411, the battery 409 and the magnet 412. The circuit of the motor 29 will therefore be opened, thus stopping the machine, and the lamp 411 will be lighted, thus indicating to the operator which one of the pick-up devices has failed to pick up a sample. If the magazine for that pick-up device is empty, the magazine is replenished, or if any adjustment of the pick-up device is necessary, such adjustment is then effected. The motor 29 being again started, the carriage 13 begins to move toward the right (Fig. 1) in which movement the pick-up devices are again carried over the magazines 9. As the arms 113 will be held locked in the separated position by means of the plate 117 and the hooks 127, the travel of the pick-up devices over the magazines in the return or right-hand direction (Fig. 1) will be an idle movement. Just before the drum 20 begins to deposit the samples upon the top sheet 1 the contact pins 400 and 401 upon the bracket 402 are carried into electrical connection with the contacts 405 and 406 upon the post 404. At this moment the contacts 391 and 392 are in engagement with the brushes 395 and 396. If any sample has been dropped by a pick-up device one of the needle holders 114 of said pick-up device will be in contact with its spring 388 and a circuit will again be closed through the appropriate lamp 411 and through the magnet 412, thereby stopping the machine and indicating to the operator which pick-up device is without a sample. A sample is then placed upon said pick-up device and the motor again started. As the drum 20 revolves above the top sheet 1, the feet 132 (Fig. 20) come into contact with the top sheet and operate the hooks 127 to release the plates 117, whereupon the springs 119 cause the arms 113 to approach each other. The samples are then stripped from the needles 115 by the presser plates 135. Said plates press the samples against the films of adhesive material which were deposited upon the top sheet by the drum 19 in the left-hand (Fig. 1) movement of the carriage 13. The carriage 13 continues its travel until it reaches the position shown in Fig. 6 when one of the pins 38 (Fig. 25) operates the clutch member 31 to reverse the travel of the carriage. The top sheet 1, carrying the samples just placed thereon, is then advanced as hereinbefore described, being cut into sections which may be properly assembled, together with inserts and the cover, and the whole fastened together and folded into the form of a book.

I would have it understood that the invention is not limited to the construction and relative arrangement of mechanisms herein shown, and that various changes may be made therein within the scope of the appended claims.

I claim as my invention:

1. A machine of the character described comprising, in combination, a frame embodying a pair of tracks spaced apart, a plurality of magazines located between said tracks each adapted to support a stack of samples, means for supporting a stack of sheets adjacent said magazines, a carriage movably supported by said tracks, a set of adhesive applying and a set of sample affixing devices mounted on said carriage and operable in the movements thereof, means for causing the carriage to travel, and means for removing a sheet from the stack when samples have been affixed thereto, said sample magazines and said sheet support being adapted to continuously present samples and sheets to their respective operating devices in the operation of the machine.

2. A sample machine having, in combination, a plurality of sample magazines, a support for a sheet, a carriage arranged to reciprocate into and out of position above said magazines and support, means on said carriage for applying adhesive material to the sheet a rotary element on the carriage, and devices on the periphery of said element for taking samples from the magazines and placing them upon the coated portions of the sheet.

3. A sample machine having, in combination, a plurality of sample magazines, a support for a sheet, a carriage arranged to reciprocate into and out of position above said magazines and support, a rotary element on the carriage, devices on the periphery of said element for applying adhesive material to the sheet, and means on said carriage for taking samples from the magazines and placing them upon the coated portions of the sheet.

4. A sample machine having, in combination, a support for a sheet, a carriage arranged to reciprocate adjacent to said support, means on said carriage for applying adhesive material to the sheet, a rotary element on the carriage, and devices on the periphery of said element for placing samples upon the coated portions of the sheet.

5. A sample machine having, in combination, a support for a sheet, a carriage arranged to reciprocate adjacent to said support, a rotary element on the carriage, devices on the periphery of said element for applying adhesive material to the sheet, another rotary element on the carriage, and devices on the second mentioned element for placing samples upon the coated portions of the sheet.

6. A sample machine having, in combination, a support for a sheet, a carriage arranged to reciprocate adjacent to said support, devices at one end of said carriage for applying adhesive material to the sheet, and devices at the other end of said carriage operable automatically in the movements thereof to pick up and apply samples to the coated portions of the sheet.

7. A sample machine having, in combination, a support for a sheet, a carriage arranged to reciprocate adjacent to said support, a rotary element on one end of the carriage, devices on the periphery of said element for applying adhesive material to the sheet, and devices on the other end of said carriage operable solely in the movements of the carriage to place samples upon the coated portions of the sheet.

8. A sample machine having, in combination, a support for a sheet, a carriage arranged to reciprocate adjacent to said support, means on one end of said carriage for applying adhesive material to the sheet, a rotary element on the other end of the carriage, and devices on the periphery of said element for placing samples upon the coated portions of the sheet.

9. A sample machine having, in combination, a support for a sheet, a carriage arranged to reciprocate adjacent to said support, a rotary element on one end of the carriage, devices on the periphery of said element for applying adhesive material to the sheet, a rotary element on the other end of the carriage, and devices on the second mentioned element for placing samples upon the coated portions of the sheet.

10. A sample machine having, in combination, a sample magazine, means for supporting a sheet, a carriage arranged to reciprocate horizontally into and out of position above said magazine and support, means for applying adhesive material to the sheet, and devices on said carriage the operation of which is incident to the movements of the carriage for taking a sample from the magazine and placing it upon the coated portion of the sheet.

11. A sample machine having, in combination, a support for a sheet having portions coated with an adhesive substance, a rotary element arranged to roll into and out of position above said support, and devices on the periphery of said element operable solely by engagement with the sheet for placing samples upon the coated portions of the sheet.

12. A sample machine having, in combination, a support for a sheet, a rotary element arranged to roll into and out of position above said support, devices on said element for applying adhesive material to the sheet, a rotary element arranged to roll into and out of position above said support, and devices on the second-mentioned element for placing samples upon the coated portions of the sheet.

13. A sample machine having, in combination, a vertically-arranged sample magazine, means for supporting a sheet alongside the magazine, a carriage arranged to reciprocate horizontally into and out of position above said magazine and support, means on said carriage for applying adhesive material to the sheet, and means on said carriage actuated automatically in the movements thereof to take a sample from the magazine and place it upon the coated portion of the sheet.

14. A sample machine, having, in combination, a plurality of sample magazines, a support for a sheet, a rotary element arranged to roll into and out of position above said support, means on said element for applying adhesive material to the sheet, and means for taking samples from the magazines and placing them upon the coated portions of the sheet.

15. A sample machine having, in combination, a plurality of sample magazines, a support for a sheet, a rotary element arranged to roll into and out of position above said magazines and support, and devices on the periphery of said element for taking samples from the magazines and placing them upon the sheet.

16. A sample machine having, in combination, a plurality of sample magazines, a support for a sheet, a rotary element arranged to roll into and out of position above said support, devices on said element for applying adhesive material to the sheet, a rotary element arranged to roll into and out of position above said magazines and support, and devices on the second-mentioned element for taking samples from the magazines and placing them upon the coated portions of the sheet.

17. A sample machine having, in combination, a plurality of sample magazines, means for supporting a sheet substantially in the plane of the outlet ends of the magazines, a drum having upon its periphery devices for selecting samples from magazines and depositing them upon the sheet, and means for rolling the drum to and from the sheet and the magazine.

18. A sample machine having, in combination, a support for a sheet, a drum arranged to roll into and out of position above said support, blocks on the periphery of said drum, means for supplying adhesive material to said blocks, said blocks being arranged to touch the sheet in the rolling movement of the drum, and means for placing samples upon the coated portions of the sheet.

19. A sample machine having, in combination, sample magazines, a support for a sheet, a drum arranged to roll to and fro above said magazines and support, devices on said drum for picking up samples from the magazines and depositing them upon said sheet, electric contact devices associated with said picking-up devices and carried by the drum, and coöperating electric mechanism for stopping the machine.

20. A sample machine having, in combination, a reciprocatory carriage, means for supporting a sheet adjacent to said carriage, means on the carriage for applying an adhesive substance to said sheet as the carriage moves in one direction, and a rotatable element on the carriage having automatically operable means for applying a sample to the adhesive substance on the sheet as the carriage moves in the other direction.

21. A sample machine having, in combination, a reciprocatory carriage, means for supporting a sheet, a rotary element on the carriage having a device arranged to apply an adhesive substance to said sheet as the carriage moves in one direction, and means on the carriage operable automatically to apply a sample to the adhesive substance on the sheet as the carriage moves in the other direction.

22. A machine having, in combination, a traveling carriage, means for supporting a sheet, means on the carriage arranged to apply an adhesive substance to certain portions of said sheet, and a rotary element on the carriage having devices on its periphery for applying an article to each of said coated portions of the sheet.

23. A machine having, in combination, a traveling carriage, means for supporting a sheet, means on the carriage arranged to apply an adhesive substance to certain portions of said sheet, and an element on the carriage having devices operating automatically in the travel of the carriage to apply an article to each of said coated portions of the sheet.

24. A machine having, in combination, a traveling carriage, means for supporting a sheet, a rotary element on the carriage having devices on its periphery arranged to apply an adhesive substance to certain portions of said sheet, and a second rotary element on the carriage having devices for applying an article to each of said coated portions.

25. A machine having, in combination, means for supporting a sheet, a rotatable drum having devices on its periphery arranged to apply an adhesive substance to certain portions of said sheet, and a second rotatable drum spaced from the first mentioned drum and having devices on its periphery arranged to pick up and apply an article to each of said coated portions of the sheet.

26. A machine having, in combination, means for supporting a sheet, a rotatable traveling drum having devices arranged to apply an adhesive substance to certain portions of said sheet, and a second rotatable drum traveling with the first mentioned drum and having devices for applying an article to each of said coated portions of the sheet.

27. A machine having, in combination, means for supporting a sheet, means for applying an adhesive substance to certain portions of said sheet, and a rotatable drum having devices on its periphery operable in the rotation of the drum to pick up and apply an article to each of said coated portions.

28. A machine having, in combination, means for supporting a sheet, a rotatable drum having devices on its periphery arranged to apply an adhesive substance to certain portions of said sheet, and a second rotatable drum spaced from the first mentioned drum and having devices for picking up and applying an article to each of said coated portions.

29. A machine having, in combination, means for applying an adhesive substance to certain portions of a sheet, and a rotatable drum having devices movable relative thereto and operable in the rotation of the drum to pick up and apply an article to each of said coated portions.

30. A machine having, in combination, means for applying an adhesive substance to a sheet, and a rotatable drum having devices on its periphery movable relative thereto and operable automatically in the rotation of the drum to pick up and apply an article to said coated sheet.

31. A machine having, in combination, a rotatable drum having devices arranged to apply an adhesive substance to a sheet, and means including a member adapted to travel in a horizontal plane and having devices thereon operable automatically to pick up and apply an article to said coated sheet.

32. A machine having, in combination, a rotatable drum having devices arranged to apply an adhesive substance to a sheet, and a second rotatable drum spaced from the first mentioned drum and having devices arranged to pick up and apply an article to said coated sheet.

33. A sample machine having, in combination, a traveling carriage, means for supporting a sheet, a plurality of sample-containing magazines, and means on the carriage actuated solely by the movement of the carriage, to select a sample from each of said magazines and apply it to the sheet.

34. A sample machine having, in combination, a traveling carriage, a plurality of sample-containing magazines, and independently operable devices on the carriage adapted to select a sample from each of said magazines and apply it to a sheet.

35. A sample machine having, in combination, a traveling carriage, means for supporting a sheet having portions coated with an adhesive substance, a plurality of sample-containing magazines, means on the carriage arranged to select samples from the magazines and apply them to coated portions of the sheet, a table, and means for moving said sheet with samples thereon onto the table.

36. A sample machine having, in combination, a traveling carriage, means for supporting a sheet having portions coated with an adhesive substance, a plurality of sample-containing magazines, means on the carriage arranged to select a sample from each of said magazines and apply it to the coated portions of the sheet, a table, means for moving said sheet with the samples thereon onto the table, and means for severing the sheet as it is moved onto the table.

37. A sample machine having, in combination, means for supporting a sheet coated with an adhesive substance, a plurality of sample-containing magazines, and a rotatable drum having devices movable relatively thereto and each arranged to select a sample from a magazine and apply it to the coated sheet.

38. A sample machine having, in combination, a traveling carriage, means for supporting a sheet coated with an adhesive substance, a plurality of sample-containing magazines, and a rotatable drum on the carriage arranged to select a sample from each of said magazines and apply it to the coated sheet.

39. A sample machine having, in combination, means for supporting a sheet, means for applying an adhesive material to the sheet, means for supporting a stack of samples, a device movable successively into engagement with the stack of samples and with the sheet and operable solely by engagement with the sample-supporting means and with the sheet to pick up a sample and apply it to the adhesive material on the sheet.

40. A sample machine having, in combination, means for supporting a sheet, a rotatable drum having a plurality of devices on its periphery arranged to apply adhesive substance to certain portions of the sheet for securing samples thereto, and means operable only as the drum rotates in one direction to feed adhesive substance to said devices.

41. A sample machine having, in combination, a track, a carriage supported by said track, a rotary element on said carriage having devices arranged to apply an adhesive substance to a sheet, a second rotary element on the carriage having devices arranged to apply a sample to the adhesive substance on the sheet, and means for reciprocating the carriage.

42. A sample machine having, in combination, a track, means for applying an adhesive substance to a sheet, a rotatable drum supported to travel on said track and having devices arranged to apply a sample to the adhesive substance on the sheet, and means for causing the drum to travel.

43. A sample machine having, in combination, a track, a rotatable drum supported to travel on said track and having devices arranged to apply an adhesive substance to a sheet, a second rotatable drum having a device arranged to apply a sample to the adhesive substance on the sheet, and means for causing said drums to travel.

44. A sample machine having, in combination, a track, a carriage supported by said track, means for causing the carriage to travel, devices adapted to act upon a sheet to secure samples thereto in the travel of the carriage, and means for stopping the travel of the carriage when one of said devices fails to act.

45. A sample machine having, in combination, a track, a carriage supported by said track, and means for causing the carriage to travel, said carriage having means adapted to act upon a sheet to secure samples thereto, said means being actuated by the movements of the carriage.

46. A sample machine having, in combination, a horizontal track, a drum arranged to travel on said track, devices on said drum arranged to select and place a sample upon a sheet, means for causing said drum to travel including an electric motor, means forming an electric circuit which is arranged to be closed by one of said devices when it fails to act, and electric mechanism in said circuit for stopping the motor when the circuit is closed.

47. A sample machine having, in combination, a track having a toothed rack, a drum having a spur wheel arranged to travel on said rack, devices on said drum arranged to select and place a sample upon a sheet, means for causing said drum to travel including an electric motor, an electric circuit for each of said selecting devices arranged to be closed by the device when it fails to act, each of said circuits having an indicating device therein, and electric mechanism adapted to stop the motor when one of said circuits is closed.

48. A sample machine having, in combination, a track having a toothed rack, a drum having a spur wheel arranged to travel on said rack, devices on said drum arranged to select and place a sample upon a sheet, means for causing said drum to travel, and an electric circuit for each of said selecting devices arranged to be closed by the device when it fails to act, each of said circuits having an indicating device therein.

49. A sample machine having, in combination, a traveling drum, means for supporting a sheet, a plurality of sample-containing magazines, and a plurality of sample pick-up devices on the periphery of said drum arranged to engage with the magazines and said supported sheet for operation thereby in the travel of the drum to select samples from the magazines and place them upon the sheet.

50. A sample machine having, in combination, a rotatable horizontally traveling drum, and a plurality of sample pick-up devices on the periphery of said drum and movable relative thereto in the rotation of the drum to pick up a sample and to deposit it upon the sheet.

51. A sample machine having, in combination, a traveling carriage and a plurality of sample pick-up devices on said carriage operable automatically in the travel of the carriage to pick up a sample and to deposit it upon a sheet.

52. A sample machine having, in combination, a carriage, means on the carriage for applying an adhesive substance to a sheet, and a plurality of sample pick-up devices on the carriage adapted to reciprocate in the travel of the carriage to pick up a sample and to deposit it upon a sheet.

53. A sample machine having, in combination, means for supporting a sample, and means for affixing the sample to a sheet comprising a device for picking up the sample operable solely by engagement with said supporting means.

54. A sample machine having, in combination, means for supporting a sheet, a carriage, an element on the carriage, means for supporting a supply of adhesive material adjacent said element, a device on said element arranged to receive a supply of material from said material-supporting means and apply it to the sheet in the movement of the carriage, a second element on the carriage and a device on said element arranged to apply a sample to the adhesive material on the sheet.

55. A sample machine having, in combination, means for supporting a sheet, a carriage, an element on the carriage means for supporting a supply of adhesive material adjacent said element, a device on said carriage arranged to receive a supply of material from said material-supporting means and apply it to the sheet in the movement of the carriage, and means for applying a sample to the adhesive material on the sheet.

56. A sample machine having, in combination, means for supporting a sheet, a rotatable drum movable into and out of engagement with the sheet, means for supporting a supply of adhesive material adjacent said drum, a device on the drum arranged to receive a supply of material from said material-supporting means and apply it to the sheet in the movement of the drum, and means for applying a sample to the adhesive material on the sheet.

57. A sample machine having, in combination, means for supporting a sheet, a carriage, and a pair of devices on the carriage arranged to receive a supply of adhesive material and a sample respectively as the carriage moves in one direction, and to apply the adhesive material and the sample to the sheet, as the carriage moves in the other direction.

58. A sample machine having, in combination, means for supporting a sheet, a rotatable drum movable into and out of engagement with the sheet, and a device on the drum having a pointed part arranged to pick up a sample and apply it to the sheet.

59. A sample machine having, in combination, means for supporting a sheet, means for supporting a sample, and an element arranged to travel horizontally into and out of engagement with the sheet and having a pointed part thereon adapted in the movement of said element to engage with the sample, pick it up and place it upon the sheet.

60. A sample machine having, in combination, means for supporting a sheet, means for supporting a sample, and a rotatable element movable relative to the sample and the sheet and having a pointed part operable in the movement of said element to pick up a sample and apply it to the sheet.

61. A sample machine having, in combination, means for supporting a sheet, means for supporting a cloth sample, means for coating the sheet with an adhesive substance, and a rotatable element movable relative to the sample and the sheet and having a device with a pair of diverging pointed parts, said device being operable in the movement of said element to engage in the sample, tension it, place it upon the coated portions of the sheet and release it.

In testimony whereof, I have hereunto set my hand.

WILLIAM P. DUN LANY.

It is hereby certified that in Letters Patent No. 1,327,665, granted January 13, 1920, upon the application of William P. Dun Lany, of Chicago, Illinois, for an improvement in "Machines for Affixing Samples to Sheets," errors appear in the printed specification requiring correction as follows: Page 1, line 99, after the numeral 9 insert the sentence *The sheets 1 are stacked upon a table 10.*; page 5, line 29, strike out the reference-numeral "175"; same page, line 92, for the reference-numeral "14" read *10*, and line 107, for the reference-numeral "200" read *86;* and that the said Letters Patent should be read with these corrections therein that the same may conform to the record of the case in the Patent Office.

Signed and sealed this 17th day of February, A. D., 1920.

[SEAL.]

M. H. COULSTON,
*Acting Commissioner of Patents.*

Cl. 216—14.